(12) United States Patent
Crespo et al.

(10) Patent No.: US 8,985,212 B1
(45) Date of Patent: Mar. 24, 2015

(54) WELLBORE SERVICING COMPOSITIONS AND METHODS OF MAKING AND USING SAME

(71) Applicant: Halliburton Energy Services, Inc., Houston, TX (US)

(72) Inventors: Freddy Molina Crespo, Humble, TX (US); B. Raghava Reddy, The Woodlands, TX (US); Natalie Pascarella, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/329,404

(22) Filed: Jul. 11, 2014

Related U.S. Application Data

(63) Continuation of application No. PCT/US2013/067546, filed on Oct. 30, 2013.

(51) Int. Cl.
| | | |
|---|---|---|
| *E21B 43/22* | (2006.01) | |
| *E21B 33/13* | (2006.01) | |
| *C09K 8/42* | (2006.01) | |
| *E21B 43/12* | (2006.01) | |
| *E21B 43/16* | (2006.01) | |

(52) U.S. Cl.
CPC . *C09K 8/42* (2013.01); *E21B 43/12* (2013.01); *E21B 43/16* (2013.01)
USPC ......... 166/300; 166/270; 166/293; 166/305.1

(58) Field of Classification Search
None
See application file for complete search history.

(56) References Cited

U.S. PATENT DOCUMENTS

| | | |
|---|---|---|
| 6,169,058 B1 | 1/2001 | Le et al. |
| 7,488,705 B2 | 2/2009 | Reddy et al. |
| 8,703,657 B2 | 4/2014 | Fang et al. |
| 2011/0237468 A1 | 9/2011 | Reichenbach-Klinke et al. |

OTHER PUBLICATIONS

Filing receipt and specification for PCT application entitled "Wellbore Servicing Compositions and Methods of Making and Using Same," by Freddy M. Crespo, et al., filed Oct. 30, 2013 as international application No. PCT/US2013/067546.
Foreign communication from a related counterpart application—International Search Report and Written Opinion, PCT/US2013/067546, Jun. 18, 2014, 14 pages.

*Primary Examiner* — Zakiya W Bates
(74) *Attorney, Agent, or Firm* — Holly Soehnge; Baker Botts L.L.P.

(57) ABSTRACT

A method of servicing a wellbore in a subterranean formation comprising preparing a wellbore servicing fluid comprising a water-soluble crosslinkable composition, a particulate water-swellable superabsorber, and an aqueous base fluid, placing the fluid in a treated portion of the formation, wherein the treated portion comprises a first region having a first region permeability and a second region having a second region permeability, wherein a permeability contrast is a ratio between first region permeability and second region permeability, and wherein the permeability contrast is equal to or greater than 10 prior to placement of the fluid, allowing the superabsorber to occupy at least a portion of the first region, thereby reducing the first region permeability, and allowing the crosslinkable composition to penetrate at least a portion of the second region, thereby reducing the second region permeability, wherein the permeability contrast is reduced to less than 10 after placement of the fluid.

37 Claims, 7 Drawing Sheets

WELLBORE SERVICING COMPOSITIONS AND METHODS OF MAKING AND USING SAME

CROSS-REFERENCE TO RELATED APPLICATION

This application is a continuation of and claims priority to International Application No. PCT/US2013/067546 filed Oct. 30, 2013 and entitled "Wellbore Servicing Compositions and Methods of Making and Using Same," which application is incorporated by reference herein in its entirety.

BACKGROUND

This disclosure relates to methods of servicing a wellbore. More specifically, it relates to methods of treating a wellbore with permeability modifying and/or sealing compositions.

Natural resources (e.g., oil or gas) residing in a subterranean formation may be recovered by driving resources from the formation into a wellbore using, for example, a pressure gradient that exists between the formation and the wellbore, the force of gravity, displacement of the resources from the formation using a pump or the force of another fluid injected into the well or an adjacent well. The production of fluid in the formation may be increased by hydraulically fracturing the formation. That is, a viscous fracturing fluid may be pumped down the wellbore at a rate and a pressure sufficient to form fractures that extend into the formation, providing additional pathways through which the oil or gas can flow to the well. Subsequently, oil or gas residing in the subterranean formation may be recovered by driving the fluid into the well using, for example, a pressure gradient that exists between the formation and the wellbore, the force of gravity, displacement of the fluid using a pump or the force of another fluid injected into the well or an adjacent well.

Unfortunately, water along with oil or gas may eventually be produced by the formation through the fractures therein. In such cases, the formation may be treated with a relative permeability modifier (RPM) that is meant to control water production, shut off water-producing intervals, and/or enhance hydrocarbon production.

Generally, two adjacent wells may be used in an enhanced oil recovery (EOR) operation, where a fluid is swept between the two adjacent wells. In EOR, a sweeping fluid may be injected in one of the wells, allowed to sweep across the formation, and then recovered along with the natural resources (e.g., oil or gas) in the adjacent well. In some cases, the formation may present loss zones (e.g., fractures), and the sweeping fluid may be "lost" to the formation via such zones and bypass unswept zones. In such cases, the formation may be treated with an RPM to seal such fractured zones and prevent the sweeping fluid from being lost to the formation.

However, in some cases, whether it is a water production problem or a lost fluid problem, the size of the fractures (e.g., vugular zones) may be too large for the RPM to be effective, i.e., for the RPM to seal the fractured zones and prevent either the water production or the loss of a fluid (e.g., a sweeping fluid) to the formation. Thus, an ongoing need exists for more effective compositions and methods of sealing fractured zones in subterranean formations.

SUMMARY

Disclosed herein is a method of servicing a wellbore in a subterranean formation comprising preparing a wellbore servicing fluid comprising a water-soluble crosslinkable composition, a particulate water-swellable superabsorber, and an aqueous base fluid, placing the wellbore servicing fluid in a treated portion of the subterranean formation, wherein the treated portion of the subterranean formation comprises a first region having a first region permeability and a second region having a second region permeability, wherein a permeability contrast is defined as a ratio between the first region permeability and the second region permeability, and wherein the permeability contrast is equal to or greater than 10 prior to placement of the wellbore servicing fluid in the treated portion of the subterranean formation, allowing the particulate water-swellable superabsorber to occupy at least a portion of the first region, thereby reducing the first region permeability, and allowing the water-soluble crosslinkable composition to penetrate at least a portion of the second region, thereby reducing the second region permeability, wherein the permeability contrast is reduced to less than 10 after placement of the wellbore servicing fluid in the treated portion of the subterranean formation.

Also disclosed herein is a method of servicing a wellbore in a subterranean formation comprising preparing a wellbore servicing fluid comprising a water-soluble crosslinkable composition, a particulate water-swellable superabsorber, and an aqueous base fluid, wherein the water-soluble crosslinkable composition comprises a copolymer of acrylamide and t-butyl acrylate crosslinked with polyethyleneimine, and wherein the particulate water-swellable superabsorber comprises crosslinked polyacrylamide, placing the wellbore servicing fluid in a treated portion of the subterranean formation, wherein the treated portion of the subterranean formation comprises a first region having a first region permeability and a second region having a second region permeability, wherein a permeability contrast is defined as a ratio between the first region permeability and the second region permeability, and wherein the permeability contrast is equal to or greater than 10 prior to placement of the wellbore servicing fluid in the treated portion of the subterranean formation, allowing the particulate water-swellable superabsorber to occupy at least a portion of the first region, thereby reducing the first region permeability, and allowing the water-soluble crosslinkable composition to penetrate at least a portion of the second region, thereby reducing the second region permeability, wherein the permeability contrast is reduced to less than 10 after placement of the wellbore servicing fluid in the treated portion of the subterranean formation.

Further disclosed herein is a pumpable wellbore servicing fluid comprising a water-soluble crosslinkable composition in an amount of from about 0.2 wt. % to about 35 wt. %, a particulate water-swellable superabsorber in an amount of from about 0.01 wt. % to about 5 wt. %, based on the total weight of the wellbore servicing fluid, and an aqueous base fluid.

Further disclosed herein is a pumpable wellbore servicing fluid system comprising (i) a permeability modifying fluid comprising a water-soluble crosslinkable composition in an amount of from about 0.2 wt. % to about 35 wt. %, a particulate water-swellable superabsorber in an amount of from about 0.01 wt. % to about 5 wt. %, based on the total weight of the wellbore servicing fluid, and an aqueous base fluid, and (ii) a sweeping fluid selected from the group consisting of a chemical flooding fluid, an alkaline flooding fluid, a polymer flooding fluid, a micellar-polymer flooding fluid, an alkali surfactant polymer flooding fluid; a miscible displacement fluid, a carbon dioxide injection fluid, a nitrogen injection fluid, a hydrocarbon injection fluid, a foam injection fluid, a microbial injection fluid; a thermal recovery fluid, a steam flooding fluid, a cyclic steam flooding fluid, a continuous steam flooding fluid, a hot water flooding fluid, an in-situ combustion fluid, a fire flooding fluid; or combinations thereof.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1:
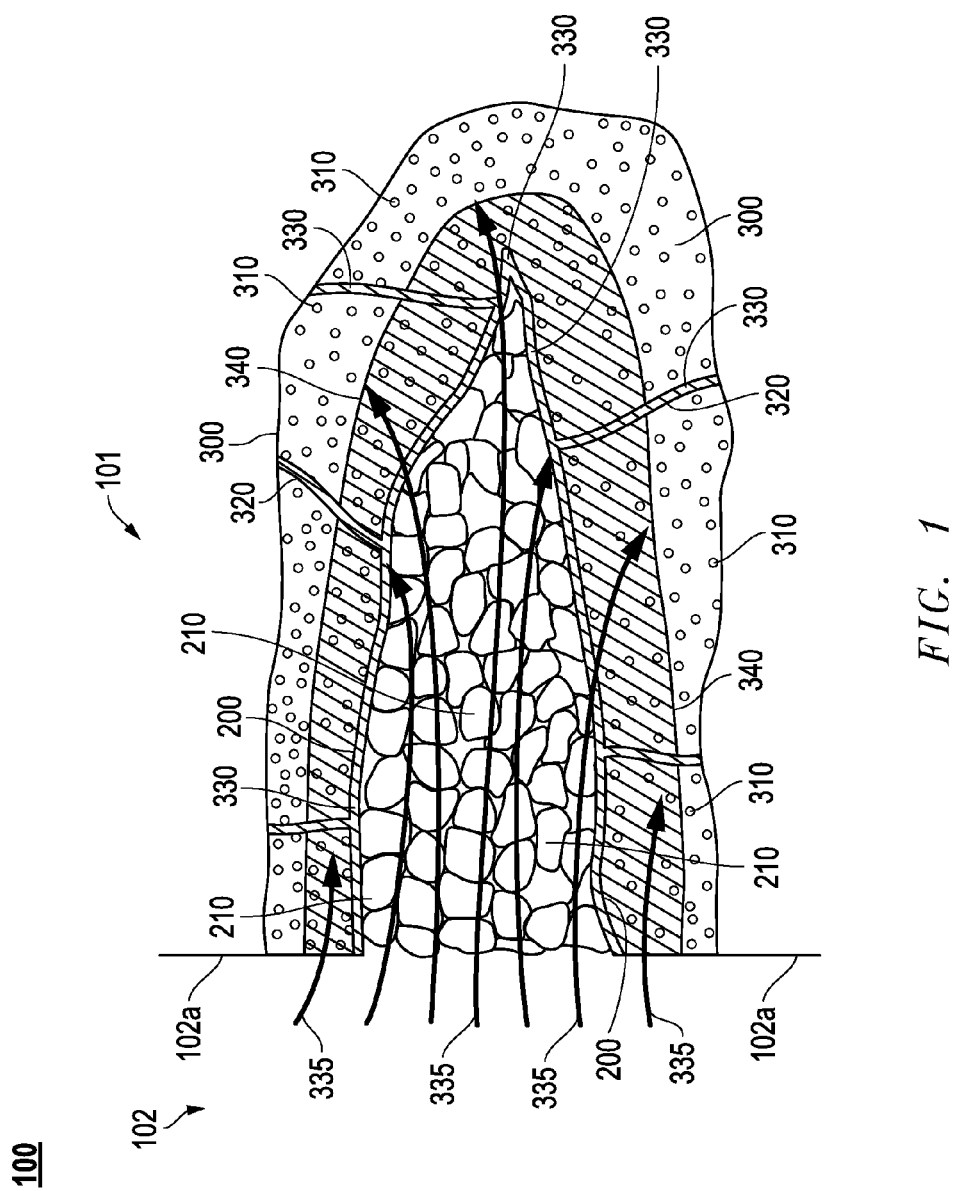
FIG. 1 is a schematic of a treated portion of a subterranean formation.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques below, including the exemplary designs and implementations illustrated and described herein, but may be modified within the scope of the appended claims along with their full scope of equivalents.

Disclosed herein are wellbore servicing fluids or compositions (collectively referred to herein as WSFs) and methods of using same. In an embodiment, the wellbore servicing fluid may comprise a water-soluble crosslinkable composition, a particulate water-swellable superabsorber, and a sufficient amount of an aqueous base fluid to form a pumpable WSF. As used herein, "water-soluble" refers to equal to or greater than about 0.01 wt. %, alternatively equal to or greater than about 0.1 wt. %, or alternatively equal to or greater than about 1 wt. % solubility in distilled water at room temperature (e.g., about 72° F.). In an embodiment, the wellbore servicing fluid may be placed (e.g., pumped) in the wellbore and/or subterranean formation, where it may be allowed to plug a permeable zone or region therein (e.g., a fracture), thereby sealing (e.g., providing or offering resistance to the flow of fluid) at least a portion of a wellbore and/or subterranean formation (e.g., modifying the permeability of at least a portion of a wellbore and/or subterranean formation).

In an embodiment, the WSF comprises a water-soluble crosslinkable composition. In some embodiments, the water-soluble crosslinkable composition may comprise a crosslinkable water-soluble polymer. In other embodiments, the water-soluble crosslinkable composition may comprise a polymerizable water-soluble monomer. Herein the disclosure may refer to a polymer and/or a polymeric material. It is to be understood that the terms polymer and/or polymeric material herein are used interchangeably and are meant to each refer to compositions comprising at least one polymerized monomer in the presence or absence of other additives traditionally included in such materials. The term "derivative" is defined herein to include any compound that is made from one or more of the crosslinkable water-soluble polymers, for example, by replacing one atom in the crosslinkable water-soluble polymer with another atom or group of atoms, rearranging two or more atoms in the crosslinkable water-soluble polymer, ionizing one of the crosslinkable water-soluble polymers, or creating a salt of one of the crosslinkable water-soluble polymers. The term "copolymer" as used herein is not limited to the combination of two monomers, but includes any combination of monomers, e.g., terpolymers, quadpolymers, tetrapolymers, and the like. The copolymers may be linear copolymers, branched copolymers, graft copolymers, block copolymers, dendritic copolymers, and the like.

In an embodiment, the crosslinkable water-soluble polymer comprises a water-soluble copolymer of a non-acidic ethylenically unsaturated polar monomer and a copolymerizable ethylenically unsaturated ester; a terpolymer and/or tetrapolymer of an ethylenically unsaturated polar monomer, an ethylenically unsaturated ester, and a monomer selected from acrylamido-2-methylpropane sulfonic acid, N-vinylpyrrolidone, or both; acrylamide-containing polymers; carboxylate-containing polymers; hydratable polymers, natural hydratable polymers, polysaccharide-containing hydratable polymers, synthetic hydratable polymers; derivatives thereof; copolymers thereof; or combinations thereof. In an embodiment, the crosslinkable water-soluble polymer or copolymer may comprise from about one to about three polar monomers. In an embodiment, the crosslinkable water-soluble polymer or copolymer may comprise from about one to about three unsaturated esters.

In an embodiment, the non-acidic ethylenically unsaturated polar monomer comprises an amide of an unsaturated carboxylic acid, e.g., a primary, a secondary, and/or a tertiary amide of an unsaturated carboxylic acid. In an embodiment, the amide of an unsaturated carboxylic acid may be derived from ammonia, a primary alkylamine and/or a secondary alkylamine. In such embodiment, the amide of an unsaturated carboxylic acid comprises an alkylol amide. Generally, alkylol amides are amides substituted by at least one hydroxyl group, such as for example ethanolamides. Nonlimiting examples of non-acidic ethylenically unsaturated polar monomers suitable for use in the present disclosure include acrylamide, methacrylamide, acrylic ethanol amide, or combinations thereof.

In an embodiment, the ethylenically unsaturated ester may be derived or prepared from a hydroxyl compound and an ethylenically unsaturated carboxylic acid. In an embodiment, the ethylenically unsaturated carboxylic acid comprises acrylic acid, methacrylic acid, crotonic acid, cinnamic acid, or combinations thereof. In such embodiment, an ethylenically unsaturated group of the ethylenically unsaturated carboxylic acid may be in the alpha-beta or beta-gamma position relative to the carboxyl group. In an alternative embodiment, the ethylenically unsaturated group of the ethylenically unsaturated carboxylic acid may be at a further distance than the beta-gamma position relative to the carboxyl group.

In an embodiment, the hydroxyl compound suitable for preparing the ethylenically unsaturated ester may be represented by the general formula ROH, wherein R is an alkyl group, alkenyl group, cycloalkyl group, aryl group, arylalkyl group, aromatic group, heterocyclic group, or combinations thereof, and wherein R may be substituted with one or more substituents, such as for example a hydroxyl group, an ether group, a thioether group, or combinations thereof. In such embodiment, the substituent can be on the same carbon atom of the R group that is bonded to the hydroxyl group in the hydroxyl compound. In an embodiment, the hydroxyl compound may be a primary, secondary, iso-, or tertiary compound. In an embodiment, a tertiary carbon atom is bonded to the hydroxyl group of the hydroxyl compound, e.g., t-butyl and trityl. In an embodiment, the ethylenically unsaturated ester comprises t-butyl acrylate.

In an embodiment, the acrylamide-containing polymers comprise polyacrylamide, partially hydrolyzed polyacrylamide, copolymers of acrylamide and acrylate, or combinations thereof. In an embodiment, the carboxylate-containing polymers comprise carboxylate-containing terpolymers and/or tetrapolymers of acrylate.

In an embodiment, the polysaccharide-containing hydratable polymers comprise hydratable polymers further comprising one or more monosaccharide units. Nonlimiting examples of monosaccharide units suitable for use in the present disclosure include galactose, mannose, glucoside, glucose, xylose, arabinose, fructose, glucuronic acid, pyranosyl sulfate, or combinations thereof.

In an embodiment, the natural hydratable polymers comprise guar gum, locust bean gum, tara gum, konjak gum, tamarind gum, starch, cellulose, karaya gum, xanthan gum, tragacanth gum, carrageenan gum, derivatives thereof, or combinations thereof. In an embodiment, natural hydratable polymers that are not crosslinkable or difficult to crosslink are not suitable for this application even if they increase fluid viscosity significantly when used by themselves. For example, diutan which is difficult to crosslink is not suitable as a component of the crosslinkable polymer composition.

In an embodiment, the synthetic hydratable polymers comprise polyacrylates, polymethacrylates, polyacrylamides, copolymers of maleic anhydride and methylvinyl ether, polyvinyl alcohols, polyvinylpyrrolidone, or combinations thereof.

In an embodiment, the water-soluble crosslinkable composition comprising a crosslinkable water-soluble polymer further comprises a crosslinker or crosslinking agent. Without wishing to be limited by theory, a crosslinker is a chemical compound or agent that enables or facilitates the formation of crosslinks, i.e., bonds that link polymeric chains to each other, with the end result of increasing the molecular weight of the polymer. When a fluid comprises a polymer (e.g., a crosslinkable water-soluble polymer), crosslinking such polymer generally leads to an increase in fluid viscosity (e.g., due to an increase in the molecular weight of the polymer), when compared to the same fluid comprising the same polymer in the same amount, but without being crosslinked. The presence of a crosslinker in a WSF comprising a crosslinkable water-soluble polymer may lead to a crosslinked fluid or gel, e.g., a fluid with increased viscosity when compared to the same fluid prior to crosslinking. For purposes of the disclosure herein, a gel is defined as a crosslinked polymer network (e.g., crosslinked water-soluble polymer network) swollen in a liquid medium and characterized by a three dimensional polymeric structure.

In an embodiment, the crosslinker comprises an organic crosslinking agent, a polyvalent metal ion, a polyvalent metal ion complex, or combinations thereof.

Nonlimiting examples of organic crosslinking agents suitable for use in the present disclosure include a polyalkyleneimine, polyethyleneimine, polypropyleneimine; a polyfunctional aliphatic amine; a polyalkylenepolyamine, polyethylenepolyamine, polypropylenepolyamine; a mixture of a phenol, paraformaldehyde and an acid catalyst; a mixture of phenol and formaldehyde; a mixture of phenol, hexamethylenetetramine and an acid catalyst; a mixture of phenyl acetate, hexamethylenetetramine and an acid catalyst; or combinations thereof.

In an embodiment, the polyvalent metal ion comprises chromium (III), chromium (VI), aluminum (III), iron (II), iron (III), zirconium (IV), or combinations thereof.

In an embodiment, the polyvalent metal ion complex comprises a molecule or complex containing a reactive transition metal cation. In an embodiment, the polyvalent metal ion complex comprises trivalent chromium cations complexed or bonded to anions or water. In an embodiment, the polyvalent metal ion complexes comprise chromium (III) propionate, chromic acetate, chromic chloride, chromium (VI) within a redox system, or combinations thereof.

In an embodiment, the water-soluble crosslinkable composition may further comprise a crosslinking delaying agent. As will be appreciated by one of skill in the art, and with the help of this disclosure, the composition of the crosslinking delaying agent depends on the water-soluble crosslinkable composition. For example, when the water-soluble crosslinkable composition comprises an acrylamide-based crosslinkable water-soluble polymer and polyethyeleneimine as the crosslinker, the crosslinking delaying agent may be an alkali metal carbonate, a phenolic compound, an acylating agent, or salts thereof. The crosslinking delaying agent may be included in the water-soluble crosslinkable composition, inter alia, to delay crosslinking of the crosslinkable water-soluble polymers until desired. As will be appreciated by one of ordinary skill in the art, and with the benefit of this disclosure, the amount of the crosslinking delaying agent may vary according to the desired application.

In an embodiment, the crosslinkable water-soluble polymer and the crosslinker may be used in any physical state or form, such as for example solids, aqueous solutions, invert emulsions (e.g., an aqueous discontinuous phase dispersed within a non-aqueous continuous phase, water-in-oil emulsions), non-aqueous suspensions, or combinations thereof. In an embodiment, the crosslinkable water-soluble polymer comprises FDP-S1065 polymer, which is a high molecular weight polyacrylamide emulsion commercially available from Halliburton Energy Services. In an embodiment, the crosslinkable water-soluble polymer and/or the crosslinker comprises one or more components of $H_2ZERO$ service and/or PERMASEAL service. The $H_2ZERO$ service and PERMASEAL service are conformance control services commercially available from Halliburton Energy Services. The $H_2ZERO$ service providing a conformance control system is a combination of HZ-10 polymer (e.g., a crosslinkable water-soluble polymer) and HZ-20 crosslinker (e.g., a crosslinker). HZ-10 polymer is a low molecular weight copolymer comprising acrylamide. HZ-20 crosslinker is a polyethyleneimine crosslinker. The HZ-10 polymer forms the $H_2ZERO$ gel sealant system when combined with the HZ-20 crosslinker. Nonlimiting examples of solid crosslinkable water-soluble polymers include polyacrylamides available under the trade name of ALCOFLOOD from BASF Corporation.

Additional examples of crosslinkable water-soluble polymers and crosslinkers suitable for forming a gel can be found in U.S. Pat. Nos. 5,836,392; 6,192,986; and 6,196,317; each of which is incorporated by reference herein in its entirety.

In an embodiment, the crosslinkable water-soluble polymer and/or the crosslinker may be included within the WSF in any suitable amount (e.g., an amount effective to form a gel). The resultant concentration and/or amount of crosslinkable water-soluble polymer and/or crosslinker that is necessary to impart desired properties to a gel (e.g., gelling time, viscosity, etc.) may be dependent upon a variety of factors such as the composition of the WSF; the type of crosslinkable water-soluble polymer used; the type of crosslinker used; the presence or absence of various additives; the intended wellbore location where the WSF is expected to gel and seal (e.g., plug, provide or offer resistance to the flow of fluid) at least a portion of the wellbore and/or subterranean formation; the temperature of the operational environment (e.g., the wellbore); the composition of the formation; the pressure of the formation; or combinations thereof.

In an embodiment, a crosslinkable water-soluble polymer of the type disclosed herein may be present within the WSF in an amount of from about 0.2 wt. % to about 30 wt. %, alternatively from about 1 wt. % to about 20 wt. %, or alternatively from about 3 wt. % to about 7 wt. %, based on the total weight of the WSF.

In an embodiment, a crosslinker of the type disclosed herein may be present within the WSF in an amount of from about 0.01 wt. % to about 5 wt. %, alternatively from about 0.1 wt. % to about 3 wt. %, or alternatively from about 0.5 wt. % to about 2 wt. %, based on the total weight of the WSF.

In an embodiment, the water-soluble crosslinkable composition comprises a polymerizable water-soluble monomer. In such embodiment, the water-soluble crosslinkable composition may further comprise a multifunctional polymerizable water-soluble crosslinker, a water-soluble polymerization initiator, an oxygen scavenger, or combinations thereof.

In an embodiment, the polymerizable water-soluble monomer comprises acrylic acid, alkylacrylic acid, ammonium, alkali and/or alkaline earth metal salts of acrylic acid and/or alkylacrylic acid, acrylamide, hydroxyalkylacrylate, hydroxyethylacrylate, hydroxyethylmethacrylate, hydroxymethylacrylate, acrylamido-2-methylpropane sulfonic acid, N-vinylpyrrolidone, derivatives thereof, or combinations thereof.

In certain embodiments, the polymerizable water-soluble monomer may be self-crosslinking. Nonlimiting examples of water-soluble polymerizable organic monomers, which are self-crosslinking, suitable for use in the present disclosure include hydroxylakylacrylate, hydroxyethylacrylate, hydroxymethylacrylate, derivatives thereof, or combinations thereof.

In an embodiment, a polymerizable water-soluble monomer of the type disclosed herein may be present within the WSF in an amount of from about 3 wt. % to about 25 wt. %, alternatively from about 5 wt. % to about 20 wt. %, or alternatively from about 10 wt. % to about 15 wt. %, based on the total weight of the WSF.

In an embodiment, the water-soluble crosslinkable composition comprising a polymerizable water-soluble monomer further comprises a multifunctional polymerizable water-soluble crosslinker. In an embodiment, the multifunctional polymerizable water-soluble crosslinker is a multifunctional compound comprising two or more reactive moieties that can form covalent bonds with other molecules during a polymerization reaction, thus leading to a crosslinked polymer. Alternatively, in an embodiment, the multifunctional polymerizable water-soluble crosslinker is a bifunctional compound comprising two or more reactive moieties that can form covalent bonds with other molecules during a polymerization reaction, thus leading to a crosslinked polymer.

In an embodiment, the multifunctional polymerizable water-soluble crosslinker comprises methylene bisacrylamide, diethylene glycol diacrylate, or combinations thereof.

In an embodiment, a multifunctional polymerizable water-soluble crosslinker of the type disclosed herein may be present within the WSF in an amount of from about 0.005 wt. % to about 5 wt. %, alternatively from about 0.01 wt. % to about 1 wt. %, or alternatively from about 0.1 wt. % to about 0.5 wt. %, based on the total weight of the polymerizable water-soluble monomer.

In an embodiment, the water-soluble crosslinkable composition comprising a polymerizable water-soluble monomer further comprises a water-soluble polymerization initiator (e.g., a primary initiator). In an embodiment, the primary initiator may be used, inter alia, to initiate polymerization of the polymerizable water-soluble monomer. Generally, an initiator (e.g., a primary initiator) may be any compound or compounds that form free radicals in an aqueous solution. The free radicals act, inter alia, to initiate polymerization of the polymerizable water-soluble monomers of the water-soluble crosslinkable composition. Nonlimiting examples of primary initiators suitable for use in the present disclosure include a water-soluble azo compound, 2,2'-azobis(2-imidazole-2-hydroxyethyl)propane, 2,2'-azobis(2-methylpropionamidine)-dihydrochloride, 2,2'-azobis(2-aminopropane), 4,4'-azobis(4-cyanovaleric acid), 2,2'-azobis(2-methyl-N-(2-hydroxyethyl)propionamide); an inorganic peroxy salt; a hydrogen peroxide-generating inorganic compound, an alkali metal persulfate, potassium persulfate, sodium persulfate; and the like. In an embodiment, the primary initiator should be present in the water-soluble crosslinkable composition in an amount sufficient to initiate polymerization of the polymerizable water-soluble monomer. In an embodiment, a primary initiator of the type disclosed herein may be present within the water-soluble crosslinkable composition in an amount of from about 0.1 wt. % to about 5 wt. %, based on the total weight of the polymerizable water-soluble monomer. As will be appreciated by one of skill in the art, and with the help of this disclosure, the required amount of primary initiator decreases with an increase in the polymerization temperature.

In an embodiment, the water-soluble crosslinkable composition comprising a polymerizable water-soluble monomer may further comprise an initiator activator (e.g., a secondary initiator). For example, an initiator activator may be used when the water-soluble crosslinkable composition is placed into a subterranean formation that is relatively cool as compared to the surface mixing temperature, such as for example when placed below the mud line in offshore operations. In an embodiment, the initiator activator may be any suitable water-soluble compound or compounds that may react with the primary initiator to provide free radicals at a lower temperature. In an embodiment, the initiator activator comprises triethanolamine. In an embodiment, an initiator activator of the type disclosed herein may be present within the water-soluble crosslinkable composition in an amount of from about 0.1 wt. % to about 5 wt. %, based on the total weight of the polymerizable water-soluble monomer.

In an embodiment, the water-soluble crosslinkable composition comprising a polymerizable water-soluble monomer further comprises an oxygen scavenger. The presence of oxygen in the water-soluble crosslinkable composition may inhibit the polymerization process of the polymerizable water-soluble monomer. In an embodiment, an oxygen scavenger, such as for example sodium sulfite, sodium bisulfite, diethyl hydroxylamine, stannous chloride, may be included in the water-soluble crosslinkable composition. In an embodiment, the stannous chloride may be pre-dissolved in a hydrochloric acid solution, in order to improve the solubility of the stannous chloride so that it may be readily combined with the water-soluble crosslinkable composition (e.g., on-the-fly). In an embodiment, the stannous chloride may be dissolved in a 0.1 wt. % aqueous hydrochloric acid solution to a concentration of stannous chloride of up to about 10 wt. %, based on the weight of the resulting stannous chloride-hydrochloric acid solution. In such embodiment, the resulting stannous chloride-hydrochloric acid solution may be included in the water-soluble crosslinkable composition in an amount in the range of from about 0.05 wt. % to about 10 wt. %, based on the weight of the water-soluble crosslinkable composition. In an embodiment, the stannous chloride may be included in the water-soluble crosslinkable composition in an amount in the range of from about 0.005 wt. % to about 1 wt. %, alternatively from about 0.01 wt. % to about 0.1 wt. %, based on the weight of the water-soluble crosslinkable composition.

In an embodiment, a water-soluble crosslinkable composition of the type disclosed herein may be present within the WSF in an amount of from about 0.2 wt. % to about 35 wt. %, alternatively from about 1 wt. % to about 30 wt. %, or alternatively from about 3 wt. % to about 29 wt. %, based on the total weight of the WSF.

In an embodiment, the WSF comprises a particulate water-swellable superabsorber. Superabsorbers (e.g., particulate water-swellable superabsorbers) are commonly used in absorbent products such as horticulture products, wipe and spill control agents, wire and cable water-blocking agents, ice shipping packs, diapers, training pants, feminine care products, and a multitude of industrial uses. Superabsorbers (e.g., particulate water-swellable superabsorbers) are swellable, crosslinked polymers that have the ability to absorb and store many times their own dry weight of aqueous liquids. Superabsorbers (e.g., particulate water-swellable superabsorbers) retain the liquid that they absorb and typically do not release the absorbed liquid, even under moderate pressures. Nonlimiting examples of particulate water-swellable superabsorbers suitable for use in the present disclosure include sodium acrylate-based polymers having three dimensional, network-like molecular structures. Without wishing to be limited by theory, the polymer chains are formed by the reaction/joining of hundreds of thousands to millions of identical units of acrylic acid monomers, which have been substantially neutralized with sodium hydroxide (caustic soda). Further, without wishing to be limited by theory, crosslinking chemicals tie the chains together to form a three-dimensional network, which enable the dry superabsorbers (e.g., particulate water-swellable superabsorbers) to absorb water or water-based solutions (e.g., an aqueous base fluid) into the spaces in the molecular network without dissolving and thus form a gel that locks up the liquid. Additional nonlimiting examples of particulate water-swellable superabsorbers suitable for use in the present disclosure include crosslinked polyacrylamide; crosslinked polyacrylate; crosslinked hydrolyzed polyacrylonitrile; salts of crosslinked carboxyalkyl starch, for example, salts of crosslinked carboxymethyl starch; salts of crosslinked carboxyalkyl cellulose, for example, salts of crosslinked carboxymethyl cellulose; salts of any crosslinked carboxyalkyl polysaccharide; crosslinked copolymers of acrylamide and acrylate monomers; crosslinked starch grafted with acrylonitrile and acrylate monomers; crosslinked polymers of two or more of allylsulfonates, 2-acryl amido-2-methyl-1-propanesulfonic acid, 3-allyloxy-2-hydroxy-1-propane-sulfonic acid, acrylamide, and acrylic acid monomers; or combinations thereof. In one embodiment, the particulate water-swellable superabsorber absorbs not only many times its dry weight of water but also increases in volume upon absorption of water many times the volume of the dry particulate water-swellable superabsorber material.

In an embodiment, the particulate water-swellable superabsorber is a dehydrated, crystalline (e.g., solid) polymer. In some embodiments, the crystalline polymer is a crosslinked polymer. In an alternative embodiment, the particulate water-swellable superabsorber is a crosslinked polyacrylamide in the form of a hard crystal. Other nonlimiting examples of water-swellable polymers suitable for use in this disclosure include pre-crosslinked dry polymers such as crosslinked hydroxylethyl cellulose (HEC).

Nonlimiting examples of commercially available particulate water-swellable superabsorbers include DIAMOND SEAL lost circulation material, CRYSTALSEAL agent, WATER LOCK superabsorbent polymer, LUQUASORB superabsorbent polymers, and AD200 polymer. DIAMOND SEAL lost circulation material and CRYSTALSEAL agent are water-swellable synthetic polymers commercially available from Halliburton Energy Services. WATER LOCK superabsorbent polymer is a biodegradable starch backbone grafted with acrylonitrile and acrylate is commercially available from Grain Processing Corporation of Muscatine, Iowa. LUQUASORB superabsorbent polymers are a brand of superabsorbent products commercially available from BASF Corporation. AD200 polymer is a water-swellable synthetic polymer commercially available from Hychem, Inc.

The superabsorber (e.g., particulate water-swellable superabsorber) absorbs water and is thus physically attracted to water molecules. Without wishing to be limited by theory, in the case where the superabsorber (e.g., particulate water-swellable superabsorber) is a solid crosslinked polymer, the polymer chain solvates and surrounds the water molecules during water absorption. In effect, the superabsorber (e.g., particulate water-swellable superabsorber) polymer undergoes a change from that of a dehydrated solid particle to that of a hydrated gel as it absorbs water. Once fully hydrated, the hydrated gel usually exhibits a high resistance to the migration of water due to its polymer chain entanglement and its relatively high viscosity. Such hydrated gel can plug permeable zones and flow pathways because it can withstand substantial amounts of pressure without being dislodged or extruded.

In an embodiment, the particulate water-swellable superabsorber has a particle size (i.e., diameter) in the range of from about 25 microns to about 6,000 microns, alternatively from about 50 microns to about 5,000 microns, alternatively from about 100 microns about 4,000 microns, alternatively from about 2,500 microns to about 3,000 microns, or alternatively from about 1,000 micron to about 2,000 microns, before it absorbs water (i.e., in its solid form).

As the particulate water-swellable superabsorber undergoes hydration, its physical size increases by from about 10 to about 1,000 times its original weight, alternatively from about 20 to about 800 times its original weight, or alternatively from about 50 to about 500 times its original weight.

In an embodiment, the particulate water-swellable superabsorber may be characterized by a swell time in a range of from about 1 minute to about 48 h, alternatively from about 5 minutes to about 16 hours, or alternatively from about 1 hour to about 8 hours. Generally, the swell time for a superabsorber (e.g., particulate water-swellable superabsorber) refers to the time needed for the superabsorber (e.g., particulate water-swellable superabsorber) to reach its maximum swollen volume and weight upon the superabsorber (e.g., particulate water-swellable superabsorber) being contacted with an aqueous medium.

As will be appreciated by one of skill in the art and with the help of this disclosure, the amount and rate by which the particulate water-swellable superabsorber increases in size may vary depending upon temperature, particulate water-swellable superabsorber grain size, and the ionic strength of the WSF. The temperature of a well typically increases from top to bottom, and as such the rate of swelling may increase as the particulate water-swellable superabsorber passes downhole. The rate of swelling also increases as the particle size of the particulate water-swellable superabsorber decreases and as the ionic strength of the carrier fluid, as controlled by salts such as sodium chloride and/or calcium chloride, decreases and vice versa.

In an embodiment, the particulate water-swellable superabsorber may be included within the WSF in any suitable amount. In an embodiment, a particulate water-swellable superabsorber of the type disclosed herein may be present within the WSF in an amount of from about 0.01 wt. % to about 5 wt. %, alternatively from about 0.1 wt. % to about 2 wt. %, or alternatively from about 0.25 wt. % to about 1 wt. %, based on the total weight of the WSF.

In an embodiment, the WSF comprises an aqueous base fluid. Herein, an aqueous base fluid refers to a fluid having equal to or less than about 20 vol. %, 15 vol. %, 10 vol. %, 5 vol. %, 2 vol. %, or 1 vol. % of a non-aqueous fluid based on the total volume of the WSF. Aqueous base fluids that may be used in the WSF include any aqueous fluid suitable for use in subterranean applications, provided that the aqueous base fluid is compatible with the water-soluble crosslinkable composition (e.g., crosslinkable water-soluble polymer, crosslinker, polymerizable water-soluble monomer, multifunctional polymerizable water-soluble crosslinker, water-soluble polymerization initiator, oxygen scavenger, etc.) and the particulate water-swellable superabsorber used in the WSF. For example, the WSF may comprise water or a brine. In an embodiment, the base fluid comprises an aqueous brine. In such an embodiment, the aqueous brine generally comprises water and an inorganic monovalent salt, an inorganic multivalent salt, or both. The aqueous brine may be naturally occurring or artificially-created. Water present in the brine may be from any suitable source, examples of which include, but are not limited to, sea water, tap water, freshwater, water that is potable or non-potable, untreated water, partially treated water, treated water, produced water, city water, well-water, surface water, or combinations thereof. The salt or salts in the water may be present in an amount ranging from greater than about 0% by weight to a saturated salt solution, alternatively from about 0 wt. % to about 35 wt. %, alternatively from about 1 wt. % to about 20 wt. %, or alternatively from about 2 wt. % to about 10 wt. %, based on the weight of the salt solution. In an embodiment, the salt or salts in the water may be present within the base fluid in an amount sufficient to yield a saturated brine. In an embodiment, the aqueous base fluid may comprise the balance of the WSF after considering the amount of the other components used.

Nonlimiting examples of aqueous brines suitable for use in the present disclosure include chloride-based, bromide-based, phosphate-based or formate-based brines containing monovalent and/or polyvalent cations, salts of alkali and alkaline earth metals, or combinations thereof. Additional examples of suitable brines include, but are not limited to: NaCl, KCl, NaBr, $CaCl_2$, $CaBr_2$, $ZnBr_2$, ammonium chloride ($NH_4Cl$), potassium phosphate, sodium formate, potassium formate, cesium formate, ethyl formate, methyl formate, methyl chloro formate, triethyl orthoformate, trimethyl orthoformate, or combinations thereof. In an embodiment, the aqueous fluid comprises a brine. The brine may be present in an amount of from about 40 wt. % to about 99 wt. %, alternatively from about 70 wt. % to about 95 wt. %, or alternatively from about 75 wt. % to about 90 wt. %, based on the total weight of the WSF. Alternatively, the aqueous base fluid may comprise the balance of the WSF after considering the amount of the other components used. In an embodiment, a preferable brine comprises one or more salts of monovalent cations and less than about 10 wt. % salts of divalent cations, based on the weight of the brine.

The WSF may further comprise additional additives as deemed appropriate for improving the properties of the fluid. Such additives may vary depending on the intended use of the fluid in the wellbore. Examples of such additives include, but are not limited to, conventional crosslinkers, weighting agents, glass fibers, carbon fibers, clay control agents, gel time retarders (e.g., a pH modifier, such as for example an acid, glacial acetic acid, etc.), gel time accelerators, dispersants, flocculants, conditioning agents, emulsifiers, lime, water softeners, acids, foaming agents, salts, oxidation inhibitors, scale inhibitors, thinners, gas scavengers, lubricants, friction reducers, antifoam agents, bases, surfactants, emulsion-hydration acceleration surfactants (e.g., an alkoxylated alcohol, an ethoxylated alcohol, such as for example an ethoxylated $C_{12}$-$C_{14}$ alcohol), mutual solvents, corrosion inhibitors, and the like, or combinations thereof. These additives may be introduced singularly or in combination using any suitable methodology and in amounts effective to produce the desired improvements in fluid properties. As will appreciated by one of skill in the art with the help of this disclosure, any of the components and/or additives used in the WSF have to be compatible with the water-soluble crosslinkable composition (e.g., crosslinkable water-soluble polymer, crosslinker, polymerizable water-soluble monomer, multifunctional polymerizable water-soluble crosslinker, water-soluble polymerization initiator, oxygen scavenger, etc.) and the particulate water-swellable superabsorber used in the WSF composition.

In an embodiment, the WSF composition comprising a water-soluble crosslinkable composition and a particulate water-swellable superabsorber may be prepared using any suitable method or process. The components of the WSF (e.g., water-soluble crosslinkable composition, crosslinkable water-soluble polymer, crosslinker, polymerizable water-soluble monomer, multifunctional polymerizable water-soluble crosslinker, water-soluble polymerization initiator, oxygen scavenger, particulate water-swellable superabsorber, aqueous base fluid, etc.) may be combined and mixed in by using any mixing device compatible with the composition, e.g., a mixer, a blender, etc.

In an embodiment, the particulate water-swellable superabsorber may be presoaked (e.g., immersed in a liquid for a time period) and optionally drained prior to being added to (e.g., combined and mixed in by using any mixing device compatible with the composition) a WSF comprising a water-soluble crosslinkable composition and/or an aqueous base fluid. For purposes of the disclosure herein, a particulate water-swellable superabsorber that has been presoaked may be referred to as a "presoaked superabsorber." In some embodiments, the particulate water-swellable superabsorber may be presoaked in the aqueous base fluid, e.g., a brine, then optionally drained, and then added to the WSF. In other embodiments, the particulate water-swellable superabsorber may be presoaked in a solution comprising the entire water-soluble crosslinkable composition and the aqueous base fluid, or one or more of the components of the water-soluble crosslinkable composition; then optionally drained; and then added to the WSF.

In an embodiment, a particulate water-swellable superabsorber may be presoaked for a time period of from about 1 minute to about 48 hours, alternatively from about 5 minutes to about 16 hours, or alternatively from about 1 hour to about 8 hours.

In an embodiment, the WSF comprises a crosslinkable water-soluble polymer, a crosslinker, a particulate water-swellable superabsorber and an aqueous base fluid. For example, the WSF may comprise 7 wt. % of a copolymer of acrylamide and t-butyl acrylate, 2 wt. % polyethyleneimine, 0.25 wt. % particulate water-swellable superabsorber, and the balance comprises a 2 wt. % KCl brine, based on the total weight of the WSF. In such embodiment, the particulate water-swellable superabsorber may be presoaked in the 2 wt. % KCl brine and optionally drained prior to adding it to the WSF.

In an embodiment, the WSF comprises a crosslinkable water-soluble polymer, a crosslinker, a particulate water-swellable superabsorber and an aqueous base fluid. For example, the WSF may comprise 0.75 wt. % FDP-S1065 polymer, 0.5 wt. % HZ-20 crosslinker, 0.25 wt. % particulate water-swellable superabsorber, and the balance comprises a 2 wt. % KCl brine, based on the total weight of the WSF. In such embodiment, the particulate water-swellable superabsorber may be presoaked in a solution comprising the crosslinkable water-soluble polymer (e.g., FDP-S1065 polymer), the crosslinker (e.g., HZ-20 crosslinker) and the aqueous base fluid (e.g., 2 wt. % KCl brine), and optionally drained prior to adding it to the WSF.

In an embodiment, the WSF comprises a crosslinkable water-soluble polymer, a crosslinker, a particulate water-swellable superabsorber and an aqueous base fluid. For example, the WSF may comprise 7 wt. % HZ-10 polymer, 2 wt. % HZ-20 crosslinker, 0.25 wt. % particulate water-swellable superabsorber, and the balance comprises a 2 wt. % KCl brine, based on the total weight of the WSF. In such embodiment, the particulate water-swellable superabsorber may be presoaked in a solution comprising the crosslinkable water-soluble polymer (e.g., HZ-10 polymer), the crosslinker (e.g., HZ-20 crosslinker) and the aqueous base fluid (e.g., 2 wt. % KCl brine), and optionally drained prior to adding it to the WSF.

In an embodiment, the WSF comprises a polymerizable water-soluble monomer, a multifunctional polymerizable water-soluble crosslinker, a water-soluble polymerization initiator, an oxygen scavenger, a particulate water-swellable superabsorber and an aqueous base fluid. For example, the WSF may comprise 15 wt. % hydroxyethylacrylate, 0.15 wt. % methylene bisacrylamide, 0.1 wt. % 2,2'-azobis(2-methyl-N-(2-hydroxyethyl)propionamide), 0.01 wt. % sodium bisulfite, 0.25 wt. % particulate water-swellable superabsorber, and the balance comprises a 2 wt. % KCl brine, based on the total weight of the WSF. In such embodiment, the particulate water-swellable superabsorber may be presoaked in a solution comprising the polymerizable water-soluble monomer (e.g., hydroxyethylacrylate), the multifunctional polymerizable water-soluble crosslinker (e.g., methylene bisacrylamide), the water-soluble polymerization initiator (e.g., 2,2'-azobis(2-methyl-N-(2-hydroxyethyl)propionamide)), the oxygen scavenger (e.g., sodium bisulfite) and the aqueous base fluid (e.g., 2 wt. % KCl brine), and optionally drained prior to adding it to the WSF.

In an embodiment, the components of the WSF are combined at the well site. In an embodiment, particulate water-swellable superabsorbers (e.g., presoaked superabsorbers) may be added to the WSF on-the-fly (e.g., in real time or on-location) along with the other components/additives. The resulting WSF may be pumped downhole where it may function as intended (e.g., seal or modify the permeability of at least a portion of a wellbore and/or subterranean formation). In some embodiments, the particulate water-swellable superabsorbers may be added to the WSF without presoaking or without presoaking and draining.

In various embodiments, the particulate water-swellable superabsorber may be presoaked with one or more components of the WSF (e.g., an aqueous base fluid, a brine; a solution comprising either a crosslinkable water-soluble polymer, a crosslinker, or both; a solution comprising a polymerizable water-soluble monomer; etc.) prior to being placed into the wellbore, for example to form a presoaked superabsorber. In such embodiments, the superabsorber may be presoaked in (e.g., pre-contacted with) one or more components of the WSF (e.g., an aqueous base fluid, a brine; a solution comprising either a crosslinkable water-soluble polymer, a crosslinker, or both; a solution comprising a polymerizable water-soluble monomer; etc.) off-site, alternatively on-the-fly at a job site, or combinations thereof. When the particulate water-swellable superabsorber is presoaked off-site, such presoaked superabsorber may be transported to the well site where it may be contacted with the other components of the WSF (e.g., water-soluble crosslinkable composition, crosslinkable water-soluble polymer, crosslinker, polymerizable water-soluble monomer, multifunctional polymerizable water-soluble crosslinker, water-soluble polymerization initiator, oxygen scavenger, aqueous base fluid, etc.).

In an embodiment, a WSF of the type disclosed herein may be used for treating at least a portion of a subterranean formation, wherein such portion of the subterranean formation may be characterized by a significant permeability contrast. For purposes of the disclosure herein, a subterranean formation or a portion thereof that has been treated with a WSF of the type disclosed herein will be referred to as "treated portion of the subterranean formation" or "treated subterranean formation." Further, for purposes of the disclosure herein, the permeability of a given portion (e.g., zone or region) of a subterranean formation may be defined as a measure of the ability of a material (rock, subterranean formation zone) to allow fluids to pass through it, and it is measured in darcy or millidarcy (mD).

In an embodiment, the subterranean formation or a portion thereof comprises a first region having a first region permeability and a second region having a second region permeability. For purposes of the disclosure herein, the permeability contrast of a subterranean formation or a portion thereof is defined as a ratio between the first region permeability and the second region permeability. Further, for purposes of the disclosure herein, a significant permeability contrast is defined as a permeability contrast having a value of equal to or greater than 10.

In an embodiment, the subterranean formation or portion thereof may be characterized by a permeability contrast of equal to or greater than 10, alternatively equal to or greater than about 15, alternatively equal to or greater than about 20, alternatively equal to or greater than about 25, alternatively equal to or greater than about 30, alternatively equal to or greater than about 35, alternatively equal to or greater than about 40, alternatively equal to or greater than about 45, alternatively equal to or greater than about 50, alternatively equal to or greater than about 60, alternatively equal to or greater than about 70, alternatively equal to or greater than about 80, alternatively equal to or greater than about 90, or alternatively equal to or greater than about 100, prior to placement of the WSF in such subterranean formation or a portion thereof (e.g., prior to treatment with the WSF comprising a water-soluble crosslinkable composition and a particulate water-swellable superabsorber of the type previously described herein). In an embodiment, the subterranean formation or portion thereof may be characterized by a Dykstra-Parsons coefficient of from about 0.6 to about 0.95, alternatively from about 0.65 to about 0.9, or alternatively from about 0.7 to about 0.9, prior to placement of the WSF in such subterranean formation or a portion thereof (e.g., prior to treatment with the WSF comprising a water-soluble crosslinkable composition and a particulate water-swellable superabsorber of the type previously described herein). The Dykstra-Parsons coefficient is a measure of permeability variation of a geological formation (e.g., a subterranean formation or portion thereof) and is a common descriptor of geological formation heterogeneity, i.e., it accounts for the presence and/or absence of both regions of high and low permeability. Dykstra-Parsons coefficient is a measure of permeability uniformity across a geological formation (e.g., a subterranean formation or portion thereof) based on the dispersion or scatter of permeability values. A homogeneous geological formation has a Dykstra-Parsons coefficient that approaches 0, while an extremely heterogeneous geological formation has a Dykstra-Parsons coefficient approaching 1.

In an embodiment, the treated subterranean formation or a portion thereof may be characterized by a permeability contrast of less than 10, alternatively from about 1 to about 10, alternatively from about 2 to about 8, or alternatively from about 2 to about 5, after placement of the WSF in the treated subterranean formation or portion thereof (e.g., after treatment with the WSF comprising a water-soluble crosslinkable composition and a particulate water-swellable superabsorber of the type previously described herein). In an embodiment, the treated subterranean formation or a portion thereof may be characterized by a Dykstra-Parsons coefficient of from about 0.1 to about 0.4, alternatively from about 0.15 to about 0.3, or alternatively from about 0.2 to about 0.25, after placement of the WSF in the treated subterranean formation or portion thereof (e.g., after treatment with the WSF comprising a water-soluble crosslinkable composition and a particulate water-swellable superabsorber of the type previously described herein).

In an embodiment, the subterranean formation comprises a carbonate formation, a shale formation, sandstone formation, or combinations thereof.

In an embodiment, the second region (e.g., low permeability region or zone) may comprise rock matrix (e.g., carbonate, shale, sandstone, etc.) that may be tightly packed rock in some cases. In such embodiment, the second region (e.g., low permeability region or zone) may comprise pores or channels that render some degree of permeability to the second region. In an embodiment, the second region comprises a porous or permeable rock matrix. In an embodiment, the second region (e.g., low permeability region or zone) may be characterized by a second region permeability of from about 0.01 mD to about 2000 mD, alternatively from about 0.1 mD to about 1500 mD, or alternatively from about 1 mD to about 1000 mD.

In an embodiment, the first region (e.g., high permeability region or zone) may comprise non-matrix type void spaces (e.g., fractures, cracks, fissures, vugular zones, cavernous zones, etc.). In such embodiment, the non-matrix type void spaces (e.g., fractures, cracks, fissures, vugular zones, cavernous zones, etc.) may be part of a fracture network. The non-matrix type void spaces may be naturally occurring, may be artificial (e.g., man-made or induced), or combinations thereof. As will be appreciated by one of skill in the art, and with the help of this disclosure, when a formation comprising tightly packed rock matrix (e.g., a carbonate formation, a shale formation, a sandstone formation, etc.) is drilled into and/or fractured, there is a high possibility for the creation of non-matrix type void spaces and/or fracture networks. In an embodiment, the first region (e.g., high permeability region or zone) may be characterized by a first region permeability of from about 3 darcys to about 100 darcys, alternatively from about 5 darcys to about 90 darcys, or alternatively from about 10 darcys to about 50 darcys.

As will be appreciated by one of ordinary skill in the art, and with the help of this disclosure, the size of the particulate water-swellable superabsorber particles may be selected based on the properties/dimensions of the non-matrix type void spaces, such that the resulting size of the particulate water-swellable superabsorber upon swelling may be sufficient to seal (e.g., plug) undesirable flow pathways (e.g., non-matrix type void spaces) in the subterranean formation, so that fluids (e.g., produced water; sweeping fluid; etc.) cannot undesirably migrate there through.

In an embodiment, the WSF comprising a water-soluble crosslinkable composition and a particulate water-swellable superabsorber of the type disclosed herein may be characterized by a gelling time of from about 1 hour to about 240 hours, alternatively from about 4 hours to about 120 hours, or alternatively from about 6 hours to about 76 hours. In an embodiment, the presence of the particulate water-swellable superabsorbers does not interfere with or alter the gelling time of the WSF. As will be appreciated by one of ordinary skill in the art, and with the help of this disclosure, the gel formed by the water-soluble crosslinkable composition of the WSF may act as a permeability contrast modifier and seal (e.g., plug) the pores or channels of the second region, thereby decreasing the permeability of the second region.

In an embodiment, the WSF comprising a water-soluble crosslinkable composition and a particulate water-swellable superabsorber of the type disclosed herein may be used in wellbores having bottom hole temperatures (BHTs) in the range of from about 60° F. to about 400° F., alternatively from about 140° F. to about 350° F., or alternatively from about 180° F. to about 300° F.

In an embodiment, after introduction of the WSF comprising a water-soluble crosslinkable composition and a particulate water-swellable superabsorber of the type disclosed herein to the subterranean formation or a portion thereof, the well may be shut-in for some period of time to afford the particulate water-swellable superabsorber sufficient time to seal (e.g., plug) undesirable flow pathways (e.g., non-matrix type void spaces) in the subterranean formation or a portion thereof. In an embodiment, the well may be shut-in for a time period in the range of from about 1 hour to about 240 hours, alternatively from about 4 hours to about 120 hours, or alternatively from about 6 hours to about 76 hours. As will be appreciated by one of ordinary skill in the art, and with the help of this disclosure, during the shut-in time period, the WSF may enter an undesirable flow pathway (e.g., non-matrix type void spaces) and gel, thereby sealing at least a portion of the subterranean formation. In an embodiment, a wellbore servicing operation may resume after the shut-in period.

In the embodiment of FIG. 1, a portion 100 of a subterranean formation 101 characterized by a significant permeability contrast is depicted. In such an embodiment, a wellbore 102 may penetrate the subterranean formation 101, and a wellbore wall 102a is shown in FIG. 1. The portion 100 of the subterranean formation 101 comprises a first region 200 having a first region permeability and a second region 300 having a second region permeability, wherein the second region 300 comprises pores 310 and channels 320.

In an embodiment, a WSF comprising a water-soluble crosslinkable composition and a particulate water-swellable superabsorber of the type previously described herein may be introduced to the portion 100 of the subterranean formation 101. The particulate water-swellable superabsorber 210 may be allowed to occupy at least a portion of the first region 200, thereby reducing the first region permeability. The water-soluble crosslinkable composition 330 may be allowed to penetrate at least a portion of the second region 300 (e.g., pores 310 and/or channels 320) as shown by penetration (e.g., seepage) flow arrows 335 of the water-soluble crosslinkable composition 330, thereby reducing the second region permeability by creating a sealed portion 340 of the second region 300.

In an embodiment, one or more portions of a subterranean formation are producing a desired natural resource (e.g., hydrocarbons, a liquid hydrocarbon, oil, etc.) along with a less desired natural resource (e.g., water, gas, etc.). In such embodiment, the flow of the less desired natural resource towards the wellbore may be reduced by placing a WSF comprising a water-soluble crosslinkable composition and a particulate water-swellable superabsorber of the type previously described herein in the portion of the subterranean formation producing the less desired natural resource, thereby modifying the permeability of such portion of the subterranean formation. In an embodiment, the flow of the less desired natural resource from the first region and/or the second region towards the wellbore after placement of the wellbore servicing fluid in the treated portion of the subterranean formation is reduced by from about 20% to about 100%, alternatively from about 50% to about 99%, or alternatively from about 75% to about 90% in comparison to the flow of the less desired natural resource from the first region and/or the second region towards the wellbore prior to placement of the WSF in the treated portion of the subterranean formation.

Figure 2A:
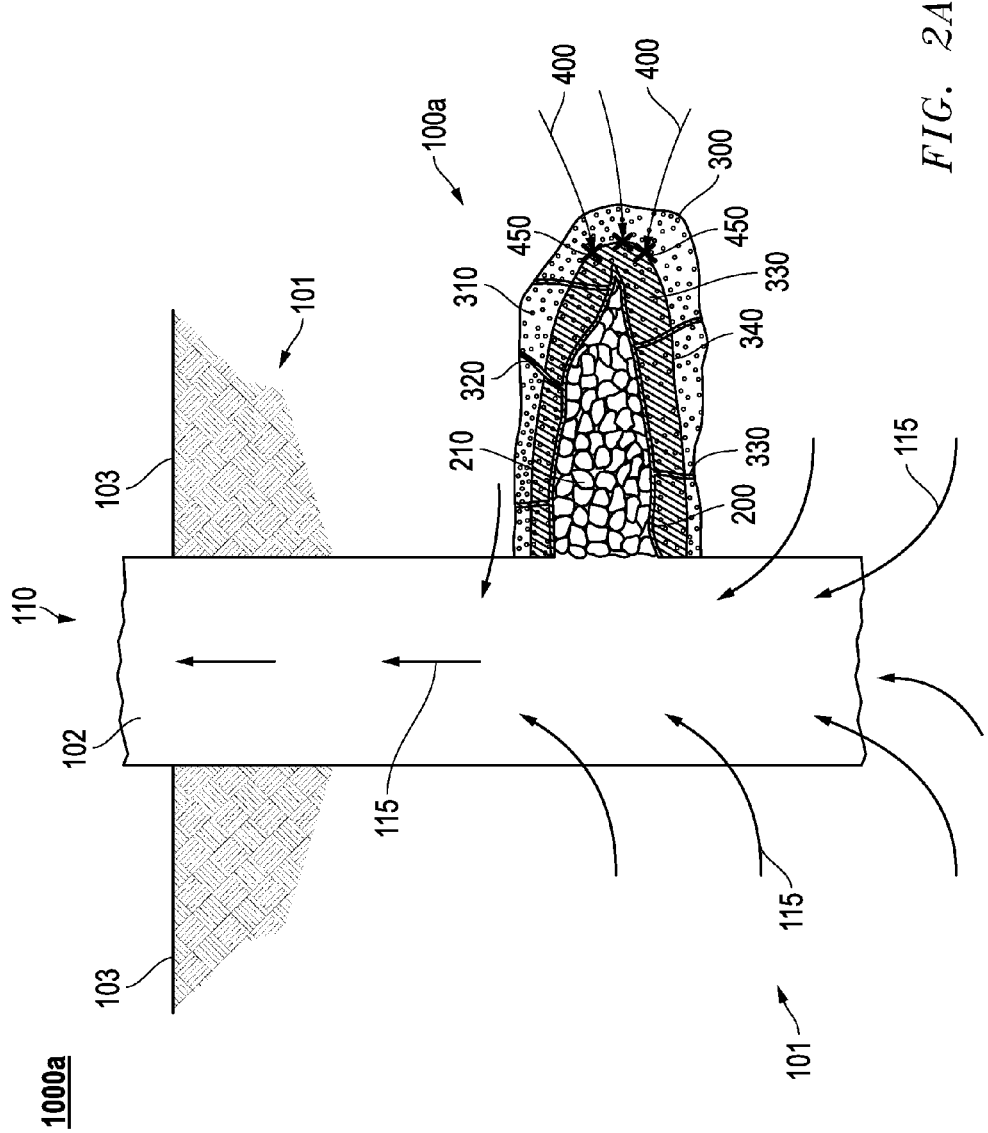
FIGS. 2A and 2B are schematics of a treated single producing well.

In an embodiment, the less desired natural resource comprises water, shown by produced water flow arrows 400 in the embodiment of FIG. 2A. In such embodiment, a wellbore servicing operation comprises a water shut-off (WSO) operation 1000a. In the embodiment of FIG. 2A, a producing well 110 subjected to a WSO operation 1000a is depicted. In such an embodiment, the wellbore 102 may extend from surface 103 and penetrate the subterranean formation 101, wherein the portion 100a of the subterranean formation 101 is characterized by a significant permeability contrast prior to the WSO operation 1000a. The portion 100a of the subterranean formation 101 comprises the first region 200 having the first region permeability and the second region 300 having the second region permeability, wherein the first region 200 comprises non-matrix type void spaces (e.g., fractures, cracks, fissures, vugular zones, cavernous zones, etc.), and wherein the second region 300 comprises permeable rock matrix having pores 310 and/or channels 320.

As seen in the embodiment of FIG. 2A, a WSF comprising a water-soluble crosslinkable composition and a particulate water-swellable superabsorber of the type previously described herein may be introduced to the portion 100a of the subterranean formation 101, as part of a WSO operation 1000a. The particulate water-swellable superabsorber 210 may be allowed to occupy at least a portion of the first region 200 (e.g., at least a portion of the non-matrix type void spaces), thereby reducing the first region permeability, i.e., reducing the ability of produced water to flow towards the wellbore 102. The water-soluble crosslinkable composition 330 may be allowed to penetrate at least a portion of the second region 300 (e.g., pores 310 and/or channels 320), thereby reducing the second region permeability by creating a sealed portion 340 of the second region 300, i.e., reducing the ability of produced water to flow towards the wellbore 102. In the embodiment of FIG. 2A, a reduction in produced water inflow from the first region 200 and/or the second region 300 towards the wellbore 102 is depicted by the "X" marks 450. Following a WSO operation 1000a, the desired natural resource depicted by the liquid hydrocarbon flow arrows 115 in the embodiment of FIG. 2A may be produced by the producing well 110.

Figure 2B:
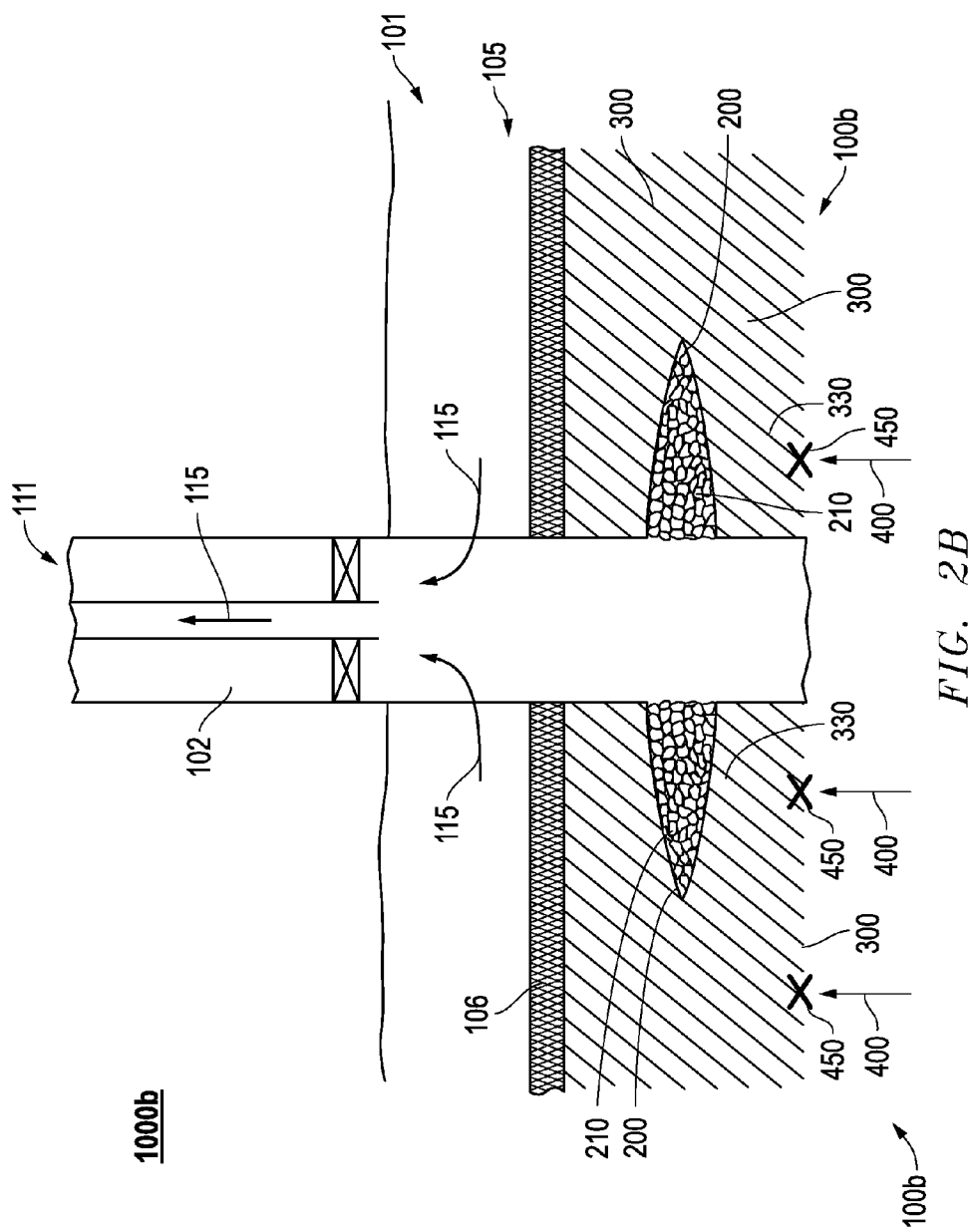

In the embodiment of FIG. 2B, a producing well 111 subjected to a WSO operation 1000b is depicted. In such an embodiment, the wellbore 102 may penetrate the subterranean formation 101, wherein a portion 100b of the subterranean formation 101 is characterized by a significant permeability contrast prior to the WSO operation 1000b, e.g., the portion 100b of the subterranean formation 101 is a water producing zone. The portion 100b of the subterranean formation 101 is separated by an impermeable barrier zone 106 (e.g., impermeable rock matrix) from an oil producing zone 105. The portion 100b of the subterranean formation 101 comprises the first region 200 having the first region permeability and the second region 300 having the second region permeability.

As seen in the embodiment of FIG. 2B, a WSF comprising a water-soluble crosslinkable composition and a particulate water-swellable superabsorber of the type previously described herein may be introduced to the portion 100b of the subterranean formation 101, as part of a WSO operation 1000b. The particulate water-swellable superabsorber 210 may be allowed to occupy at least a portion of the first region 200 (e.g., at least a portion of the non-matrix type void spaces), thereby reducing the first region permeability, i.e., reducing the ability of produced water to flow towards the wellbore 102. The water-soluble crosslinkable composition 330 may be allowed to penetrate at least a portion of the second region 300 (e.g., at least a portion of the permeable rock matrix), thereby reducing the second region permeability, i.e., reducing the ability of produced water to flow towards the wellbore 102. In the embodiment of FIG. 2B, produced water inflow is represented by produced water flow arrows 400. A reduction in produced water inflow from the first region 200 and/or the second region 300 towards wellbore 102 is depicted by the "X" marks 450. Following a WSO operation 1000b, the desired natural resource depicted by the liquid hydrocarbon flow arrows 115 in the embodiment of FIG. 2B may be produced by the producing well 111.

In an embodiment, the wellbore service being performed is an enhanced oil recovery (EOR) operation, wherein a sweeping fluid is injected (e.g., placed, pumped downhole) in the subterranean formation through an injector well; wherein the injector well is positioned offset from a recovery well; wherein the sweeping fluid is allowed to traverse a portion of the subterranean formation located between the injector well and the recovery well; and wherein at least a portion of the sweeping fluid is recovered along with a natural resource via the recovery well.

EOR is an oil recovery enhancement method also known as improved oil recovery (IOR) or tertiary recovery (as opposed to primary and secondary recovery). Although called tertiary recovery, EOR may be initiated and carried out at any stage during the lifetime of a wellbore. EOR is a generic term for techniques for increasing the amount of crude oil that can be extracted from a hydrocarbon-producing formation (e.g., hydrocarbon reservoirs, such as oil reservoirs). EOR generally uses techniques that alter the original properties of the natural resource (e.g., oil), such as for example viscosity, with the purpose of recovering such natural resource by improving natural resource (e.g., oil) displacement or fluid flow in the reservoir. EOR may be conducted through a variety of methods, such as for example chemical flooding (e.g., alkaline flooding, polymer flooding, micellar-polymer flooding, alkali surfactant polymer flooding, etc.); miscible displacement (e.g., carbon dioxide ($CO_2$) injection, nitrogen ($N_2$) injection, hydrocarbon injection, foam injection, microbial injection, etc.); thermal recovery (steam flooding, cyclic steam flooding, continuous steam flooding, hot water flooding, in-situ combustion, fire flooding, etc.); and the like; or combinations thereof. As will be appreciated by one of skill in the art, and with the help of this disclosure, the choice of EOR method depends on a variety of factors, such as for example natural resource reservoir temperature, pressure, depth, net pay, permeability, residual oil and water saturations, porosity and fluid properties such as oil API gravity and viscosity.

In an embodiment, the sweeping fluid may comprise a fluid selected from the group consisting of a chemical flooding fluid, an alkaline flooding fluid, a polymer flooding fluid, a micellar-polymer flooding fluid, an alkali surfactant polymer flooding fluid; a miscible displacement fluid, a carbon dioxide injection fluid, a nitrogen injection fluid, a hydrocarbon injection fluid, a foam injection fluid, a microbial injection fluid; a thermal recovery fluid, a steam flooding fluid, a cyclic steam flooding fluid, a continuous steam flooding fluid, a hot water flooding fluid, an in-situ combustion fluid, a fire flooding fluid; or combinations thereof.

In an embodiment, a portion of the subterranean formation may have a significant permeability contrast, and a portion of the sweeping fluid may be lost to the subterranean formation by entering the first region and/or the second region of the subterranean formation. In such embodiment, an amount of sweeping fluid entering the first region and/or the second region of the subterranean formation may be reduced by placing a WSF comprising a water-soluble crosslinkable composition and a particulate water-swellable superabsorber of the type previously described herein in the portion of the subterranean formation comprising the first region and/or the second region, thereby reducing the first region permeability and/or the second region permeability and improving a fluid injection profile to sweep regions of the formation which could have otherwise been bypassed by the sweeping fluid used in a flooding operation (e.g., as part of an EOR operation) due to a significant permeability contrast. Such operations, referred to as "conformance control treatments," minimize loss of the sweeping fluids into high permeability regions and redirect the sweeping fluids into unswept zones containing a desired fluid (e.g., a desired natural resource, such as for example oil) and displace it towards the recovery well. In an embodiment, the amount of sweeping fluid entering the first region and/or the second region of the subterranean formation after placement of the wellbore servicing fluid in the treated portion of the subterranean formation is reduced by from about 20% to about 100%, alternatively from about 50% to about 99%, or alternatively from about 75% to about 90% in comparison to the amount of sweeping fluid entering the first region and/or the second region prior to placement of the WSF in the treated portion of the subterranean formation.

In an embodiment, after treatment with a WSF comprising a water-soluble crosslinkable composition and a particulate water-swellable superabsorber of the type previously described herein, a subterranean formation may be characterized by a more uniform permeability across a distance between the injector well and the recovery well, when compared to the permeability of the same subterranean formation across the same distance between the injector well and the recovery well prior to placement of the WSF therein. As will be appreciated by one of ordinary skill in the art, and with the help of this disclosure, a fluid introduced to a subterranean formation will follow the path of least resistance, meaning that when a WSF comprising a particulate water-swellable superabsorber is introduced to a subterranean formation comprising a first region (e.g., non-matrix type void spaces), the WSF comprising the particulate water-swellable superabsorber will travel to the first region, wherein the particulate water-swellable superabsorber will seal the first region.

In an embodiment, a pumpable wellbore servicing fluid system may be used in an EOR operation. In such embodiment, the pumpable wellbore servicing fluid system may comprise (i) a permeability modifying fluid, such as for example a WSF of the type disclosed herein, wherein the permeability modifying fluid comprises a water-soluble crosslinkable composition and a particulate water-swellable superabsorber of the type disclosed herein; and (ii) a sweeping fluid of the type disclosed herein.

In an embodiment, a method of servicing a wellbore in a subterranean formation comprises (i) preparing a wellbore servicing fluid comprising a water-soluble crosslinkable composition, a particulate water-swellable superabsorber, and an aqueous base fluid; (ii) placing the wellbore servicing fluid in at least a portion of the subterranean formation located between an injector well and a recovery well, wherein the subterranean formation has permeability contrast of equal to or greater than 10 across a distance between the injector well and the recovery well prior to placement of the wellbore servicing fluid therein; (iii) allowing the wellbore servicing fluid to seal at least a portion of the subterranean formation, wherein the permeability contrast of the subterranean formation is reduced to less than about 10 across the distance between the injector well and the recovery well after placement of the wellbore servicing fluid therein; and (iv) placing a sweeping fluid in the injector well and recovering at least a portion of the sweeping fluid along with a natural resource via the recovery well. In such embodiment, the subterranean formation comprises one or more low permeability zones (e.g., second regions comprising permeable rock matrix) and one or more high permeability zones (e.g., first regions comprising non-matrix type void spaces) across the distance between the injector well and the recovery well, prior to placing the wellbore servicing fluid in the subterranean formation.

In an embodiment, a method of servicing a wellbore in a subterranean formation comprises (i) preparing a wellbore servicing fluid comprising a water-soluble crosslinkable composition, a particulate water-swellable superabsorber, and an aqueous base fluid, wherein the water-soluble crosslinkable composition comprises a crosslinkable water-soluble polymer comprising a copolymer of acrylamide and t-butyl acrylate, wherein the crosslinkable water-soluble polymer is further crosslinked with polyethyleneimine, and wherein the particulate water-swellable superabsorber comprises crosslinked polyacrylamide; (ii) placing the wellbore servicing fluid in at least a portion of the subterranean formation located between an injector well and a recovery well, wherein the subterranean formation has permeability contrast of equal to or greater than 10 across a distance between the injector well and the recovery well prior to placement of the wellbore servicing fluid therein; (iii) allowing the wellbore servicing fluid to seal at least a portion of the subterranean formation, wherein the permeability contrast of the subterranean formation is reduced to less than about 10 across the distance between the injector well and the recovery well after placement of the wellbore servicing fluid therein; and (iv) placing a sweeping fluid in the injector well and recovering at least a portion of the sweeping fluid along with a natural resource via the recovery well. In such embodiment, the particulate water-swellable superabsorber may be presoaked in the aqueous base fluid comprising the water-soluble crosslinkable composition.

Figure 3:
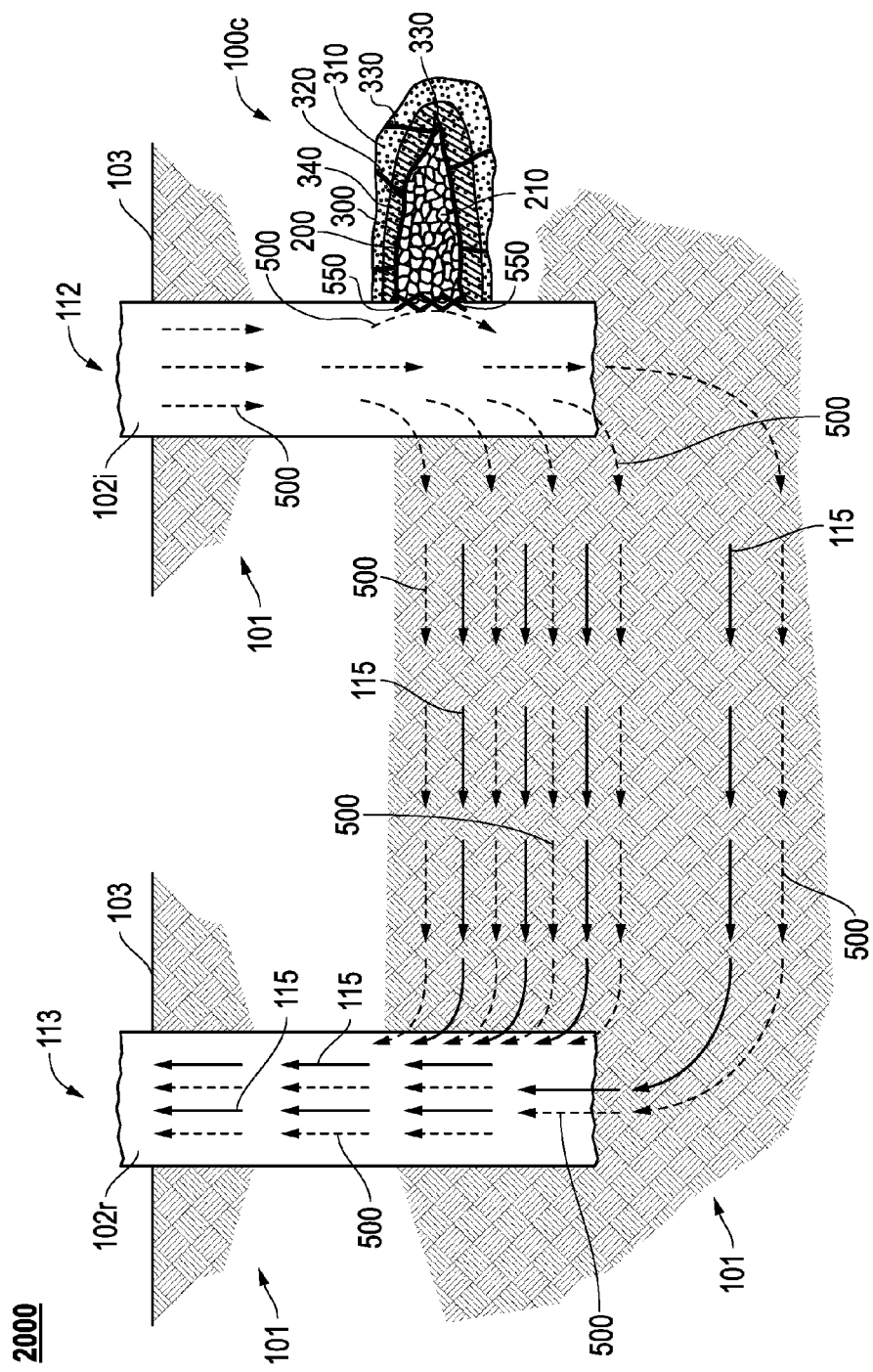
FIG. 3 is a schematic of a treated injector well.

In an embodiment, a wellbore servicing operation comprises an EOR operation 2000. In the embodiment of FIG. 3, an injector well 112 positioned offset from a recovery well 113 is depicted. In such embodiment, a wellbore 102$i$ of the injector well 112 and a wellbore 102$r$ of the recovery well 113 may each extend from surface 103 and penetrate the subterranean formation 101, wherein a portion 100$c$ of the subterranean formation 101 is characterized by a significant permeability contrast prior to the EOR operation 2000, e.g., a sweeping fluid may undesirably enter the portion 100$c$ of the subterranean formation 101 and may be lost or otherwise ineffective/inefficient. The portion 100$c$ of the subterranean formation 101 comprises the first region 200 having the first region permeability and the second region 300 having the second region permeability, wherein the first region 200 comprises non-matrix type void spaces (e.g., fractures, cracks, fissures, vugular zones, cavernous zones, etc.), and wherein the second region 300 comprises permeable rock matrix having pores 310 and/or channels 320.

As seen in the embodiment of FIG. 3, a WSF comprising a water-soluble crosslinkable composition and a particulate water-swellable superabsorber of the type previously described herein may be introduced to the portion 100$c$ of the subterranean formation 101, as part of an EOR operation 2000. The particulate water-swellable superabsorber 210 may be allowed to occupy at least a portion of the first region 200 (e.g., at least a portion of the non-matrix type void spaces), thereby reducing the first region permeability, i.e., reducing the ability of the sweeping fluid to enter the first region 200. The water-soluble crosslinkable composition 330 may be allowed to penetrate at least a portion of the second region 300 (e.g., at least a portion of the permeable rock matrix), thereby reducing the second region permeability by creating a sealed portion 340 of the second region 300, i.e., reducing the ability of the sweeping fluid to enter the second region 300. In the embodiment of FIG. 3, the sweeping fluid is represented by sweeping fluid flow arrows 500. A reduction in the amount of sweeping fluid entering the first region 200 and/or the second region 300 is depicted by the "X" marks 550.

During an EOR operation 2000, the sweeping fluid may flow 500 through (e.g., sweep across) the subterranean formation 101 between the injector well 112 and the recovery well 113, and at least a portion of the sweeping fluid may be recovered via the recovery well 113 along with a natural resource, wherein the flow of a natural resource (e.g., a liquid hydrocarbon) is depicted by liquid hydrocarbon flow arrows 115.

In an embodiment, the WSF comprising a water-soluble crosslinkable composition and a particulate water-swellable superabsorber and methods of using the same disclosed herein may be advantageously employed as a servicing fluid in the performance of one or more wellbore servicing operations, such as for example a WSO operation and/or an EOR operation. For example, the use of a WSF comprising a water-soluble crosslinkable composition and a particulate water-swellable superabsorber of the type disclosed herein may advantageously allow for sealing water and/or gas producing regions/zones in a subterranean formation (e.g., as part of a WSO operation), thereby improving the quality of the produced natural resource (e.g., a liquid hydrocarbon). For example, the use of a WSF comprising a water-soluble crosslinkable composition and a particulate water-swellable superabsorber of the type disclosed herein may advantageously allow for sealing non-matrix type void spaces (e.g., fractures, cracks, fissures, vugular zones, cavernous zones, etc.) in an EOR operation, thereby preventing the loss of sweeping fluid. Conventional treatments for sealing water and/or gas producing regions/zones in a subterranean formation or for sealing non-matrix type void spaces (e.g., fractures, cracks, fissures, vugular zones, cavernous zones, etc.) in an EOR operation employ permeability contrast modifiers which do not have the ability to seal large spaces, such as for example non-matrix type void spaces.

In an embodiment, the use of a WSF comprising a water-soluble crosslinkable composition and a particulate water-swellable superabsorber of the type disclosed herein may advantageously provide for an improved sweep efficiency during an EOR operation.

In an embodiment, the water-soluble crosslinkable composition (e.g., crosslinkable water-soluble polymer, polymerizable water-soluble monomer) of the WSF may advantageously function as a permeability contrast modifier. In such embodiment, the particulate water-swellable superabsorber may seal the high permeability regions or zones (e.g., first region), while the crosslinkable water-soluble polymer may seal the low permeability regions or zones (e.g., second region), along with sealing smaller spaces present in the high permeability regions (e.g., spaces present between particulate water-swellable superabsorber particles), subsequent to placing the particulate water-swellable superabsorber in the high permeability regions. As will be appreciated by one of skill in the art, and with the help of this disclosure, the particulate water-swellable superabsorber may seal (e.g., plug) the non-matrix type void spaces (e.g., fractures, cracks, fissures, vugular zones, cavernous zones, etc.) of the high permeability regions (e.g., first region), but not necessarily the smaller pores and/or channels that might be present in the adjacent low permeability regions (e.g., second region). Further, as will be appreciated by one of skill in the art, and with the help of this disclosure, the smaller pores and/or channels may be sealed by a permeability contrast modifier, such as for example the water-soluble crosslinkable composition (e.g., crosslinkable water-soluble polymer, polymerizable water-soluble monomer) of the WSF. Additional advantages of the WSF system and/or the methods of using the same may be apparent to one of skill in the art viewing this disclosure.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

The sealing properties of a fluid comprising a particulate water-swellable superabsorber were investigated. More specifically, the ability of a fluid comprising a particulate water-swellable superabsorber to pass through a relatively large slit in a disc was investigated. The control fluid comprised 0.75 wt. % FDP-S1065 polymer emulsion and 13 gallons per thousand gallons (gptg) HZ-20 crosslinker (0.4 wt. % active crosslinker) in a 2 wt. % KCl brine. The polymer emulsion was hydrated in water under stirring in a Waring blender for 30 minutes prior to mixing with the crosslinker solution. Two test fluids were prepared by adding presoaked superabsorber to the control fluid. Test fluid A was prepared by presoaking a particulate water-swellable superabsorber in a 2 wt. % KCl brine for 8 hours at 140° F., draining the presoaked superabsorber, and adding the presoaked superabsorber to a fresh sample of the control fluid such that the final concentration of the particulate water-swellable superabsorber in the test fluid A was 0.25 wt. %, based on the total weight of the fluid. Test fluid B was prepared by presoaking a particulate water-swellable superabsorber in the control fluid, draining the presoaked superabsorber, and adding the presoaked superabsorber to a fresh sample of the control fluid such that the final concentration of the particulate water-swellable superabsorber in the test fluid B was 0.25 wt. %, based on the total weight of the fluid. The particulate water-swellable superabsorber was presoaked to ensure a similar volume of fluid used in each of the three experiments. The three fluids (e.g., control fluid, test fluid A, test fluid B) were then tested in a fluid loss control experiment.

Figure 4:
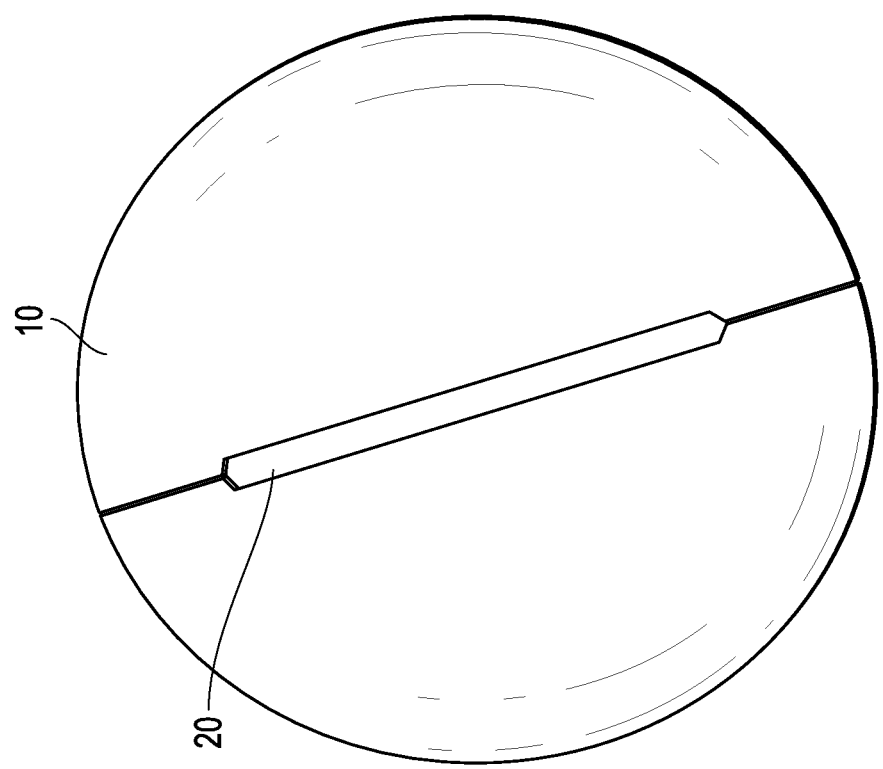
FIG. 4 is a picture of a disc with a slit used in a fluid loss test.
Figure 5:
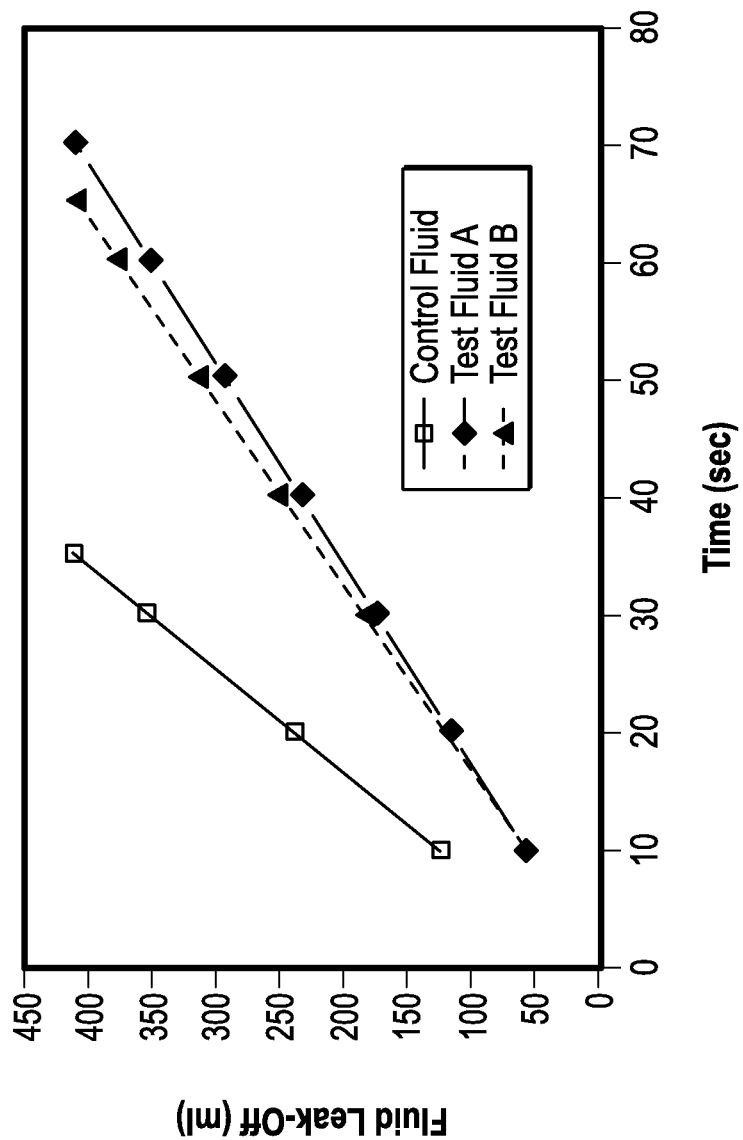
FIG. 5 displays the results of a fluid loss test in the presence and in the absence of a particulate water-swellable superabsorber.

The fluid loss control experiments were conducted in a fluid loss cell equipped with a slotted bottom plate (e.g., a disc with a slit). FIG. 4 displays a picture of the disc 10 where the large slit 20 is visible. The dimensions of the slit 20 were 50 mm length and 4 mm width. The slotted bottom plate was used to simulate a fracture in a subterranean formation, wherein the fracture (e.g., the slit 20 modeling a high permeability zone, such as for example a first region) has a high permeability to fluids, and the rock matrix (e.g., permeable rock matrix) surrounding the fracture has a very low permeability to fluids (e.g., the body of the disc 10 modeling a low permeability zone, such as for example a second region). The fluid loss cell had a capacity of 500 mL, and a volume of 400 mL of each tested fluid was used in each experiment. Fluid leak off rates were measured for each of the three fluids under a pressure of 50 psi, and the results are presented in FIG. 5. As the results in FIG. 5 indicate, the fluid leak off rate was significantly lower when a particulate water-swellable superabsorber was used in the fluid. For example, the fluid leak off rate was reduced from 12.3 mL/s in the case of the control fluid to 5.9 mL/sec for test fluid A and 6.4 mL/s for test fluid B. As seen in FIG. 5, it takes less than 40 s for the entire volume (e.g., 400 mL) of control fluid to pass through the slit 20. When the particulate water-swellable superabsorber is present in the fluid, such as in the case of test fluid A and test fluid B, the time needed for the same volume (e.g., 400 mL) of fluid to pass through the slit 20 doubles. The results in FIG. 5 indicate that the particulate water-swellable superabsorber prevents the fluid from passing through the slit 20.

Example 2

Figure 6:
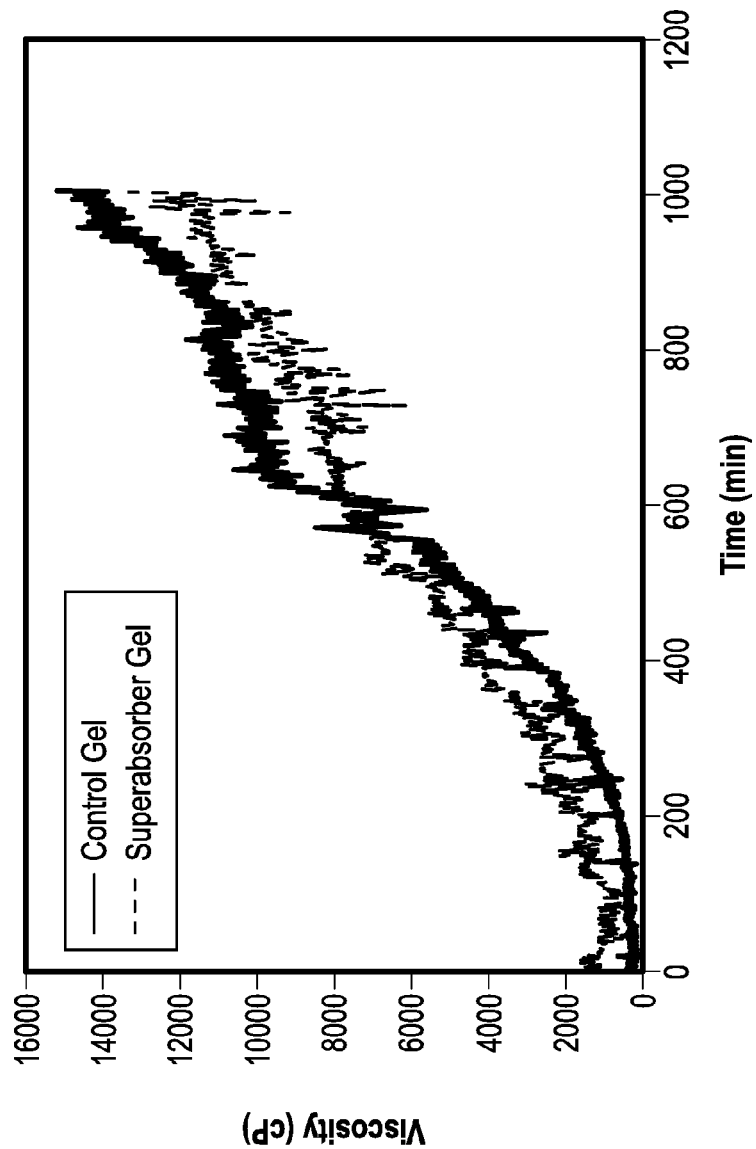
FIG. 6 displays the results of a polymer gelling test in the presence and in the absence of a particulate water-swellable superabsorber.

The gelling properties of a fluid comprising a crosslinkable water-soluble polymer and a crosslinker were investigated. More specifically, the ability of a fluid to gel in the presence and in the absence of a particulate water-swellable superabsorber was investigated. Two samples were investigated. One sample was a control gel comprising 0.75 wt. % FDP-S1065 polymer (e.g., active polymer) and 0.4 wt. % HZ-20 crosslinker (e.g., active crosslinker) and the control gel was prepared as described in Example 1 for the control fluid. Another sample was a superabsorber gel prepared by adding a dry particulate water-swellable superabsorber to the control sample/gel in an amount of 0.25 wt. %, based on the total weight of the fluid. The particulate water-swellable superabsorber used had a particle size of about 2 mm. The gelling times were measured by bottle tests in an oven set at 180° F., and the results are displayed in FIG. 6. FIG. 6 shows that the viscosity increase profile was the same, irrespective of the presence of the particulate water-swellable superabsorber in the gel. In both cases it took about 300 minutes for the viscosity of the gel to start increasing. The viscosity increased at the same rate in both cases. The final viscosity was the same for both samples. The results displayed in FIG. 6 clearly indicate that the particulate water-swellable superabsorber does not affect the gelling time, suggesting that the particulate water-swellable superabsorber does not selectively adsorb any of the other components present in the fluid, such as for example a crosslinkable water-soluble polymer (e.g., FDP-S1065 polymer) or a crosslinker (e.g., HZ-20 crosslinker).

Example 3

The gelling properties of a fluid comprising a crosslinkable water-soluble polymer and a crosslinker were investigated. More specifically, the ability of a fluid to gel based on the order in which the components of the fluid were mixed and the pH of the solution prior to gelling was investigated. The crosslinker used was a polyvalent metal ion (e.g., chromium (III) propionate) and the crosslinkable water-soluble polymer used was a partially hydrolyzed polyacrylamide. The partially hydrolyzed polyacrylamide had a hydrolysis level of about 30% and a molecular weight greater than about 10 million, and was used as a water-in-oil emulsion. Suitable amounts of the partially hydrolyzed polyacrylamide emulsion were added to water containing an emulsion-hydration acceleration surfactant (e.g., an ethoxylated $C_{12}$-$C_{14}$ alcohol) under constant stirring over a period of 30 minutes to obtain a 0.75 wt. % crosslinkable water-soluble polymer concentration. Three samples were investigated. For preparing a first sample, 0.5 grams solid particulate water-swellable superabsorber were added to 96.7 mL of the 0.75 wt. % crosslinkable water-soluble polymer solution, followed by 0.14 mL of chromium (III) propionate solution. For preparing a second sample, the same amount/concentration of chromium (III) propionate solution was added to the 0.75 wt. % crosslinkable water-soluble polymer solution, followed by the same amount/concentration of the solid particulate water-swellable superabsorber, as in the case of the first sample. The pH value of the first sample was 6.0 and the pH value of the second sample was 5.2. In the case of the first sample, the whole solution turned green, whereas in the case of the second sample, the presoaked/swollen superabsorber particles were green indicating chromium absorption in the solid matrix of the superabsorber. In both cases (e.g., for the first sample and for the second sample), the solution phase began to gel at 140° F. in about 30 minutes resulting in a highly deformable lipping gel. The gel became firm and non-flowable within 2 hours in both cases (e.g., for the first sample and for the second sample). In both cases (e.g., for the first sample and for the second sample), the results show that the particulate water-swellable superabsorber did not alter the gel times of metal-crosslinked acrylamide polymer. For preparing a third sample, glacial acetic acid was added to the 0.75 wt. % crosslinkable water-soluble polymer solution to lower the pH to 3.4 to retard the gel time. Next, the crosslinker (e.g., chromium (III) propionate) was added to the 0.75 wt. % crosslinkable water-soluble polymer solution having a pH of 3.4, followed by the particulate water-swellable superabsorber in the same amounts/concentrations as before (e.g., as for the first sample and the second sample). The gel times for the third sample were longer than the gel times for the first sample and the second sample, and the presoaked/swollen superabsorber displayed a darker green color when compared to the second sample. The result demonstrates that gel time retarders can be used to extend/lengthen the gel times in the presence of a particulate water-swellable superabsorber. In all the testing, the particulate water-swellable superabsorber was presoaked/swollen in the entire composition or in the presence of only the crossslinkable water-soluble polymer, and in all cases the presoaked/swollen superabsorber was not drained. The results demonstrate that the presoaked/swollen superabsorber need not be drained, and the draining step is optional and could be useful for those cases where the presoaked/swollen superabsorber requires reinforcement with a crosslinked gel inside the presoaked/swollen solid matrix of the superabsorber.

ADDITIONAL DISCLOSURE

The following are nonlimiting, specific embodiments in accordance with the present disclosure:

A first embodiment, which is a method of servicing a wellbore in a subterranean formation comprising preparing a wellbore servicing fluid comprising a water-soluble crosslinkable composition, a particulate water-swellable superabsorber, and an aqueous base fluid, placing the wellbore servicing fluid in a treated portion of the subterranean formation, wherein the treated portion of the subterranean formation comprises a first region having a first region permeability and a second region having a second region permeability, wherein a permeability contrast is defined as a ratio between the first region permeability and the second region permeability, and wherein the permeability contrast is equal to or greater than 10 prior to placement of the wellbore servicing fluid in the treated portion of the subterranean formation, allowing the particulate water-swellable superabsorber to occupy at least a portion of the first region, thereby reducing the first region permeability, and allowing the water-soluble crosslinkable composition to penetrate at least a portion of the second region, thereby reducing the second region permeability, wherein the permeability contrast is reduced to less than 10 after placement of the wellbore servicing fluid in the treated portion of the subterranean formation.

A second embodiment, which is the method of the first embodiment wherein the subterranean formation comprises a carbonate formation, a shale formation, a sandstone formation, or combinations thereof.

A third embodiment, which is the method of one of the first through second embodiments wherein the first region comprises a non-matrix type void space and the second region comprises a permeable rock matrix.

A fourth embodiment, which is the method of one of the first through third embodiments wherein the treated portion of the subterranean formation has a Dykstra-Parsons coefficient of from about 0.6 to about 0.95 prior to placement of the wellbore servicing fluid in the treated portion of the subterranean formation and a Dykstra-Parsons coefficient of from about 0.1 to about 0.4 after placement of the wellbore servicing fluid in the treated portion of the subterranean formation.

A fifth embodiment, which is the method of one of the first through fourth embodiments wherein the first region permeability is from about 3 darcys to about 100 darcys.

A sixth embodiment, which is the method of one of the first through fifth embodiments wherein the second region permeability is from about 0.01 mD to about 2000 mD.

A seventh embodiment, which is the method of one of the first through sixth embodiments wherein the wellbore is a producing well from which a desired natural resource and a less desired natural resource are recovered, and wherein a flow of the less desired natural resource from the first region and/or the second region towards the wellbore after placement of the wellbore servicing fluid in the treated portion of the subterranean formation is reduced by from about 20% to about 100% in comparison to a flow of the less desired natural resource from the first region and/or the second region towards the wellbore prior to placement of the wellbore servicing fluid in the treated portion of the subterranean formation.

An eighth embodiment, which is the method of the seventh embodiment wherein the desired natural resource comprises one or more liquid hydrocarbons and the less desired natural resource comprises water, a gas, or combinations thereof.

A ninth embodiment, which is the method of one of the first through sixth embodiments wherein servicing the wellbore in the subterranean formation comprises a water shut-off operation.

A tenth embodiment, which is the method of one of the first through sixth embodiments, wherein the wellbore is an injector well into which a sweeping fluid is injected; wherein the injector well is positioned offset from a recovery well; wherein upon injection of the sweeping fluid into the injector well, the sweeping fluid traverses a portion of the subterranean formation located between the injector well and the recovery well; wherein at least a portion of the sweeping fluid is recovered along with a natural resource via the recovery well; and wherein an amount of the sweeping fluid entering the first region and/or the second region after placement of the wellbore servicing fluid in the treated portion of the subterranean formation is reduced by from about 20% to about 100% in comparison to the amount of sweeping fluid entering the first region and/or the second region prior to placement of the wellbore servicing fluid in the treated portion of the subterranean formation.

An eleventh embodiment, which is the method of the tenth embodiment wherein the sweeping fluid comprises a chemical flooding fluid, an alkaline flooding fluid, a polymer flooding fluid, a micellar-polymer flooding fluid, an alkali surfactant polymer flooding fluid; a miscible displacement fluid, a carbon dioxide injection fluid, a nitrogen injection fluid, a hydrocarbon injection fluid, a foam injection fluid, a microbial injection fluid; a thermal recovery fluid, a steam flooding fluid, a cyclic steam flooding fluid, a continuous steam flooding fluid, a hot water flooding fluid, an in-situ combustion fluid, a fire flooding fluid; or combinations thereof.

A twelfth embodiment, which is the method of one of the first through sixth embodiments wherein servicing the wellbore in the subterranean formation comprises an enhanced oil recovery operation.

A thirteenth embodiment, which is the method of the twelfth embodiment wherein the enhanced oil recovery operation comprises chemical flooding, alkaline flooding, polymer flooding, micellar-polymer flooding, alkali surfactant polymer flooding; miscible displacement, carbon dioxide injection, nitrogen injection, hydrocarbon injection, foam injection, microbial injection; thermal recovery, steam flooding, cyclic steam flooding, continuous steam flooding, hot water flooding, in-situ combustion, fire flooding; or combinations thereof.

A fourteenth embodiment, which is the method of one of the first through thirteenth embodiments wherein the water-soluble crosslinkable composition comprises a crosslinkable water-soluble polymer comprising a water-soluble copolymer of a non-acidic ethylenically unsaturated polar monomer and a copolymerizable ethylenically unsaturated ester; a terpolymer and/or tetrapolymer of an ethylenically unsaturated polar monomer, an ethylenically unsaturated ester, and a monomer selected from acrylamido-2-methylpropane sulfonic acid, N-vinylpyrrolidone, or both; acrylamide-containing polymers; carboxylate-containing polymers; hydratable polymers, natural hydratable polymers, polysaccharide-containing hydratable polymers, synthetic hydratable polymers; derivatives thereof; copolymers thereof; or combinations thereof.

A fifteenth embodiment, which is the method of the fourteenth embodiment wherein the crosslinkable water-soluble polymer is present in the wellbore servicing fluid in an amount of from about 0.2 wt. % to about 30 wt. % based on the total weight of the wellbore servicing fluid.

A sixteenth embodiment, which is the method of one of the fourteenth through fifteenth embodiments wherein the water-soluble crosslinkable composition further comprises a crosslinker.

A seventeenth embodiment, which is the method of the sixteenth embodiment wherein the crosslinker comprises an organic crosslinking agent, a polyalkyleneimine, polyethyleneimine, polypropyleneimine; a polyfunctional aliphatic amine; a polyalkylenepolyamine, polyethylenepolyamine, polypropylenepolyamine; a mixture of a phenol, paraformaldehyde and an acid catalyst; a mixture of phenol and formaldehyde; a mixture of phenol, hexamethylenetetramine and an acid catalyst; a mixture of phenyl acetate, hexamethylenetetramine and an acid catalyst; a polyvalent metal ion, chromium (III), chromium (VI), aluminum (III), iron (II), iron (III), zirconium (IV); a polyvalent metal ion complex, trivalent chromium cations complexed to anions or water, chromium (III) propionate, chromic acetate, chromic chloride, chromium (VI) within a redox system; or combinations thereof.

An eighteenth embodiment, which is the method of one of the sixteenth through seventeenth embodiments wherein the crosslinker is present in the wellbore servicing fluid in an amount of from about 0.01 wt. % to about 5 wt. % based on the total weight of the wellbore servicing fluid.

A nineteenth embodiment, which is the method of one of the first through thirteenth embodiments wherein the water-soluble crosslinkable composition comprises a polymerizable water-soluble monomer comprising acrylic acid, alkylacrylic acid, ammonium, alkali and/or alkaline earth metal salts of acrylic acid and/or alkylacrylic acid, acrylamide, hydroxyalkylacrylate, hydroxyethylacrylate, hydroxyethylmethacrylate, hydroxymethylacrylate, acrylamido-2-methylpropane sulfonic acid, N-vinylpyrrolidone, derivatives thereof, or combinations thereof.

A twentieth embodiment, which is the method of the nineteenth embodiment wherein the water-soluble crosslinkable composition further comprises a multifunctional polymerizable water-soluble crosslinker, a water-soluble polymerization initiator, an oxygen scavenger, or combinations thereof.

A twenty-first embodiment, which is the method of the twentieth embodiment wherein the multifunctional polymerizable water-soluble crosslinker comprises methylene bisacrylamide, diethylene glycol diacrylate, or combinations thereof.

A twenty-second embodiment, which is the method of one of the twentieth through twenty-first embodiments wherein the water-soluble polymerization initiator comprises a water-soluble azo compound, 2,2'-azobis(2-imidazole-2-hydroxyethyl)propane, 2,2'-azobis(2-methyl-propionamidine)dihydrochloride, 2,2'-azobis(2-aminopropane), 4,4'-azobis(4-cyanovaleric acid), 2,2'-azobis(2-methyl-N-(2-hydroxyethyl)propionamide); an inorganic peroxy salt; a hydrogen peroxide-generating inorganic compound, an alkali metal persulfate, potassium persulfate, sodium persulfate; and the like.

A twenty-third embodiment, which is the method of one of the first through twenty-second embodiments wherein the water-soluble crosslinkable composition is present in the wellbore servicing fluid in an amount of from about 0.2 wt. % to about 35 wt. % based on the total weight of the wellbore servicing fluid.

A twenty-fourth embodiment, which is the method of one of the first through twenty-third embodiments wherein the particulate water-swellable superabsorber comprises sodium acrylate-based polymers, crosslinked polyacrylamide; crosslinked polyacrylate; crosslinked hydrolyzed polyacrylonitrile; salts of crosslinked carboxyalkyl starch, salts of crosslinked carboxymethyl starch; salts of crosslinked carboxyalkyl cellulose, salts of crosslinked carboxymethyl cellulose; crosslinked hydroxyethyl cellulose; salts of any crosslinked carboxyalkyl polysaccharide; crosslinked copolymers of acrylamide and acrylate monomers; crosslinked starch grafted with acrylonitrile and acrylate monomers; crosslinked polymers of two or more of allylsulfonates, 2-acrylamido-2-methyl-1-propanesulfonic acid, 3-allyloxy-2-hydroxy-1-propane-sulfonic acid, acrylamide, and acrylic acid monomers; or combinations thereof.

A twenty-fifth embodiment, which is the method of one of the first through twenty-fourth embodiments wherein the particulate water-swellable superabsorber has a particle size in the range of from about 25 microns to about 6,000 microns, prior to absorbing water.

A twenty-sixth embodiment, which is the method of one of the first through twenty-fifth embodiments wherein the particulate water-swellable superabsorber has a swell time in a range of from about 1 minute to about 48 h.

A twenty-seventh embodiment, which is the method of one of the first through twenty-sixth embodiments wherein the particulate water-swellable superabsorber is presoaked in the aqueous base fluid, a brine, the aqueous base fluid comprising the water-soluble crosslinkable composition, components thereof, or combinations thereof.

A twenty-eighth embodiment, which is the method of one of the first through twenty-seventh embodiments wherein the particulate water-swellable superabsorber is present in the wellbore servicing fluid in an amount of from about 0.01 wt. % to about 5 wt. % based on the total weight of the wellbore servicing fluid.

A twenty-ninth embodiment, which is a method of servicing a wellbore in a subterranean formation comprising preparing a wellbore servicing fluid comprising a water-soluble crosslinkable composition, a particulate water-swellable superabsorber, and an aqueous base fluid, wherein the water-soluble crosslinkable composition comprises a copolymer of acrylamide and t-butyl acrylate crosslinked with polyethyleneimine, and wherein the particulate water-swellable superabsorber comprises crosslinked polyacrylamide, placing the wellbore servicing fluid in a treated portion of the subterranean formation, wherein the treated portion of the subterranean formation comprises a first region having a first region permeability and a second region having a second region permeability, wherein a permeability contrast is defined as a ratio between the first region permeability and the second region permeability, and wherein the permeability contrast is equal to or greater than 10 prior to placement of the wellbore servicing fluid in the treated portion of the subterranean formation, allowing the particulate water-swellable superabsorber to occupy at least a portion of the first region, thereby reducing the first region permeability, and allowing the water-soluble crosslinkable composition to penetrate at least a portion of the second region, thereby reducing the second region permeability, wherein the permeability contrast is reduced to less than 10 after placement of the wellbore servicing fluid in the treated portion of the subterranean formation.

A thirtieth embodiment, which is the method of the twenty-ninth embodiment wherein the particulate water-swellable superabsorber is presoaked in the aqueous base fluid comprising the water-soluble crosslinked composition.

A thirty-first embodiment, which is the method of one of the twenty-ninth through thirtieth embodiments wherein the subterranean formation comprises a carbonate formation, a shale formation, a sandstone formation, or combinations thereof.

A thirty-second embodiment, which is a pumpable wellbore servicing fluid comprising a water-soluble crosslinkable composition in an amount of from about 0.2 wt. % to about 35 wt. %, a particulate water-swellable superabsorber in an amount of from about 0.01 wt. % to about 5 wt. %, based on the total weight of the wellbore servicing fluid, and an aqueous base fluid.

A thirty-third embodiment, which is the wellbore servicing fluid of the thirty-second embodiment wherein the water-soluble crosslinkable composition comprises a crosslinkable water-soluble polymer in an amount of from about 0.2 wt. % to about 30 wt. % based on the total weight of the wellbore servicing fluid.

A thirty-fourth embodiment, which is the wellbore servicing fluid of one of the thirty-second through thirty-third embodiments further comprising a crosslinker in an amount of from about 0.01 wt. % to about 5 wt. % based on the total weight of the wellbore servicing fluid.

A thirty-fifth embodiment, which is the wellbore servicing fluid of the thirty-fourth embodiment wherein the water-soluble crosslinkable composition comprises a polymerizable water-soluble monomer.

A thirty-sixth embodiment, which is the wellbore servicing fluid of the thirty-fifth embodiment further comprising a multifunctional polymerizable water-soluble crosslinker, a water-soluble polymerization initiator, an oxygen scavenger, or combinations thereof.

A thirty-seventh embodiment, which is a pumpable wellbore servicing fluid system comprising (i) a permeability modifying fluid comprising a water-soluble crosslinkable composition in an amount of from about 0.2 wt. % to about 35 wt. %, a particulate water-swellable superabsorber in an amount of from about 0.01 wt. % to about 5 wt. %, based on the total weight of the wellbore servicing fluid, and an aqueous base fluid, and (ii) a sweeping fluid selected from the group consisting of a chemical flooding fluid, an alkaline flooding fluid, a polymer flooding fluid, a micellar-polymer flooding fluid, an alkali surfactant polymer flooding fluid; a miscible displacement fluid, a carbon dioxide injection fluid, a nitrogen injection fluid, a hydrocarbon injection fluid, a foam injection fluid, a microbial injection fluid; a thermal recovery fluid, a steam flooding fluid, a cyclic steam flooding fluid, a continuous steam flooding fluid, a hot water flooding fluid, an in-situ combustion fluid, a fire flooding fluid; or combinations thereof.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k^*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of servicing a wellbore in a subterranean formation comprising:
   preparing a wellbore servicing fluid comprising a water-soluble crosslinkable composition, a particulate water-swellable superabsorber, and an aqueous base fluid;
   placing the wellbore servicing fluid in a treated portion of the subterranean formation, wherein the treated portion of the subterranean formation comprises a first region having a first region permeability and a second region having a second region permeability, wherein a permeability contrast is defined as a ratio between the first region permeability and the second region permeability, and wherein the permeability contrast is equal to or greater than 10 prior to placement of the wellbore servicing fluid in the treated portion of the subterranean formation;
   allowing the particulate water-swellable superabsorber to occupy at least a portion of the first region, thereby reducing the first region permeability; and
   allowing the water-soluble crosslinkable composition to penetrate at least a portion of the second region, thereby reducing the second region permeability, wherein the permeability contrast is reduced to less than 10 after placement of the wellbore servicing fluid in the treated portion of the subterranean formation.

2. The method of claim 1 wherein the subterranean formation comprises a carbonate formation, a shale formation, a sandstone formation, or combinations thereof.

3. The method of claim 1 wherein the first region comprises a non-matrix type void space and the second region comprises a permeable rock matrix.

4. The method of claim 1 wherein the treated portion of the subterranean formation has a Dykstra-Parsons coefficient of from about 0.6 to about 0.95 prior to placement of the wellbore servicing fluid in the treated portion of the subterranean formation and a Dykstra-Parsons coefficient of from about 0.1 to about 0.4 after placement of the wellbore servicing fluid in the treated portion of the subterranean formation.

5. The method of claim 1 wherein the first region permeability is from about 3 darcys to about 100 darcys.

6. The method of claim 1 wherein the second region permeability is from about 0.01 mD to about 2000 mD.

7. The method of claim 1 wherein the wellbore is a producing well from which a desired natural resource and a less desired natural resource are recovered, and wherein a flow of the less desired natural resource from the first region and/or the second region towards the wellbore after placement of the wellbore servicing fluid in the treated portion of the subterranean formation is reduced by from about 20% to about 100% in comparison to a flow of the less desired natural resource from the first region and/or the second region towards the wellbore prior to placement of the wellbore servicing fluid in the treated portion of the subterranean formation.

8. The method of claim 7 wherein the desired natural resource comprises one or more liquid hydrocarbons and the less desired natural resource comprises water, a gas, or combinations thereof 9. The method of claim 1 wherein servicing the wellbore in the subterranean formation comprises a water shut-off operation.

10. The method of claim 1, wherein the wellbore is an injector well into which a sweeping fluid is injected; wherein the injector well is positioned offset from a recovery well; wherein upon injection of the sweeping fluid into the injector well, the sweeping fluid traverses a portion of the subterranean formation located between the injector well and the recovery well; wherein at least a portion of the sweeping fluid is recovered along with a natural resource via the recovery well; and wherein an amount of the sweeping fluid entering the first region and/or the second region after placement of the wellbore servicing fluid in the treated portion of the subterranean formation is reduced by from about 20% to about 100% in comparison to the amount of sweeping fluid entering the first region and/or the second region prior to placement of the wellbore servicing fluid in the treated portion of the subterranean formation.

11. The method of claim 10 wherein the sweeping fluid comprises a chemical flooding fluid, an alkaline flooding fluid, a polymer flooding fluid, a micellar-polymer flooding fluid, an alkali surfactant polymer flooding fluid; a miscible displacement fluid, a carbon dioxide injection fluid, a nitrogen injection fluid, a hydrocarbon injection fluid, a foam injection fluid, a microbial injection fluid; a thermal recovery fluid, a steam flooding fluid, a cyclic steam flooding fluid, a continuous steam flooding fluid, a hot water flooding fluid, an in-situ combustion fluid, a fire flooding fluid; or combinations thereof.

12. The method of claim 1 wherein servicing the wellbore in the subterranean formation comprises an enhanced oil recovery operation.

13. The method of claim 12 wherein the enhanced oil recovery operation comprises chemical flooding, alkaline flooding, polymer flooding, micellar-polymer flooding, alkali surfactant polymer flooding; miscible displacement, carbon dioxide injection, nitrogen injection, hydrocarbon injection, foam injection, microbial injection; thermal recovery, steam flooding, cyclic steam flooding, continuous steam flooding, hot water flooding, in-situ combustion, fire flooding; or combinations thereof.

14. The method of claim 1 wherein the water-soluble crosslinkable composition comprises a crosslinkable water-soluble polymer comprising a water-soluble copolymer of a non-acidic ethylenically unsaturated polar monomer and a copolymerizable ethylenically unsaturated ester; a terpolymer and/or tetrapolymer of an ethylenically unsaturated polar monomer, an ethylenically unsaturated ester, and a monomer selected from acrylamido-2-methylpropane sulfonic acid, N-vinylpyrrolidone, or both; acrylamide-containing polymers; carboxylate-containing polymers; hydratable polymers, natural hydratable polymers, polysaccharide-containing hydratable polymers, synthetic hydratable polymers; derivatives thereof; copolymers thereof; or combinations thereof.

15. The method of claim 14 wherein the crosslinkable water-soluble polymer is present in the wellbore servicing fluid in an amount of from about 0.2 wt. % to about 30 wt. % based on the total weight of the wellbore servicing fluid.

16. The method of claim 14 wherein the water-soluble crosslinkable composition further comprises a crosslinker.

17. The method of claim 16 wherein the crosslinker comprises an organic crosslinking agent, a polyalkyleneimine, polyethyleneimine, polypropyleneimine; a polyfunctional aliphatic amine; a polyalkylenepolyamine, polyethylenepolyamine, polypropylenepolyamine; a mixture of a phenol, paraformaldehyde and an acid catalyst; a mixture of phenol and formaldehyde; a mixture of phenol, hexamethylenetetramine and an acid catalyst; a mixture of phenyl acetate, hexamethylenetetramine and an acid catalyst; a polyvalent metal ion, chromium (III), chromium (VI), aluminum (III), iron (II), iron (III), zirconium (IV); a polyvalent metal ion complex, trivalent chromium cations complexed to anions or water, chromium (III) propionate, chromic acetate, chromic chloride, chromium (VI) within a redox system; or combinations thereof.

18. The method of claim 16 wherein the crosslinker is present in the wellbore servicing fluid in an amount of from about 0.01 wt. % to about 5 wt. % based on the total weight of the wellbore servicing fluid.

19. The method of claim 1 wherein the water-soluble crosslinkable composition comprises a polymerizable water-soluble monomer comprising acrylic acid, alkylacrylic acid, ammonium, alkali and/or alkaline earth metal salts of acrylic acid and/or alkylacrylic acid, acrylamide, hydroxyalkylacrylate, hydroxyethylacrylate, hydroxyethylmethacrylate, hydroxymethylacrylate, acrylamido-2-methylpropane sulfonic acid, N-vinylpyrrolidone, derivatives thereof, or combinations thereof.

20. The method of claim 19 wherein the water-soluble crosslinkable composition further comprises a multifunctional polymerizable water-soluble crosslinker, a water-soluble polymerization initiator, an oxygen scavenger, or combinations thereof.

21. The method of claim 20 wherein the multifunctional polymerizable water-soluble crosslinker comprises methylene bisacrylamide, diethylene glycol diacrylate, or combinations thereof.

22. The method of claim 20 wherein the water-soluble polymerization initiator comprises a water-soluble azo compound, 2,2'-azobis(2-imidazole-2-hydroxyethyl)propane, 2,2'-azobis(2-methylpropionamidine)dihydrochloride, 2,2'-azobis(2-aminopropane), 4,4'-azobis(4-cyanovaleric acid), 2,2'-azobis(2-methyl-N-(2-hydroxyethyl)propionamide); an inorganic peroxy salt; a hydrogen peroxide-generating inorganic compound, an alkali metal persulfate, potassium persulfate, sodium persulfate; and the like.

23. The method of claim 1 wherein the water-soluble crosslinkable composition is present in the wellbore servicing fluid in an amount of from about 0.2 wt. % to about 35 wt. % based on the total weight of the wellbore servicing fluid.

24. The method of claim 1 wherein the particulate water-swellable superabsorber comprises sodium acrylate-based polymers; crosslinked polyacrylamide; crosslinked polyacrylate; crosslinked hydrolyzed polyacrylonitrile; salts of crosslinked carboxyalkyl starch, salts of crosslinked carboxymethyl starch; salts of crosslinked carboxyalkyl cellulose, salts of crosslinked carboxymethyl cellulose; crosslinked hydroxylethyl cellulose; salts of any crosslinked carboxyalkyl polysaccharide; crosslinked copolymers of acrylamide and acrylate monomers; crosslinked starch grafted with acrylonitrile and acrylate monomers; crosslinked polymers of two or more of allylsulfonates, 2-acrylamido-2-methyl-1-propanesulfonic acid, 3-allyloxy-2-hydroxy-1-propane-sulfonic acid, acrylamide, and acrylic acid monomers; or combinations thereof.

25. The method of claim 1 wherein the particulate water-swellable superabsorber has a particle size in the range of from about 25 microns to about 6,000 microns, prior to absorbing water.

26. The method of claim 1 wherein the particulate water-swellable superabsorber has a swell time in a range of from about 1 minute to about 48 h.

27. The method of claim 1 wherein the particulate water-swellable superabsorber is presoaked in the aqueous base fluid, a brine, the aqueous base fluid comprising the water-soluble crosslinkable composition, components thereof, or combinations thereof.

28. The method of claim 1 wherein the particulate water-swellable superabsorber is present in the wellbore servicing fluid in an amount of from about 0.01 wt. % to about 5 wt. % based on the total weight of the wellbore servicing fluid.

29. A method of servicing a wellbore in a subterranean formation comprising:
preparing a wellbore servicing fluid comprising a water-soluble crosslinkable composition, a particulate water-swellable superabsorber, and an aqueous base fluid, wherein the water-soluble crosslinkable composition comprises a copolymer of acrylamide and t-butyl acrylate crosslinked with polyethyleneimine, and wherein the particulate water-swellable superabsorber comprises crosslinked polyacrylamide;
placing the wellbore servicing fluid in a treated portion of the subterranean formation, wherein the treated portion of the subterranean formation comprises a first region having a first region permeability and a second region having a second region permeability, wherein a permeability contrast is defined as a ratio between the first region permeability and the second region permeability, and wherein the permeability contrast is equal to or greater than 10 prior to placement of the wellbore servicing fluid in the treated portion of the subterranean formation;
allowing the particulate water-swellable superabsorber to occupy at least a portion of the first region, thereby reducing the first region permeability; and
allowing the water-soluble crosslinkable composition to penetrate at least a portion of the second region, thereby reducing the second region permeability, wherein the permeability contrast is reduced to less than 10 after placement of the wellbore servicing fluid in the treated portion of the subterranean formation.

30. The method of claim 29 wherein the particulate water-swellable superabsorber is presoaked in the aqueous base fluid comprising the water-soluble crosslinked composition.

31. The method of claim 29 wherein the subterranean formation comprises a carbonate formation, a shale formation, a sandstone formation, or combinations thereof.

32. A pumpable wellbore servicing fluid comprising a water-soluble crosslinkable composition in an amount of from about 0.2 wt. % to about 35 wt. %, a particulate water-swellable superabsorber in an amount of from about 0.01 wt. % to about 5 wt. %, based on the total weight of the wellbore servicing fluid, and an aqueous base fluid.

33. The wellbore servicing fluid of claim 32 wherein the water-soluble crosslinkable composition comprises a crosslinkable water-soluble polymer in an amount of from about 0.2 wt. % to about 30 wt. % based on the total weight of the wellbore servicing fluid.

34. The wellbore servicing fluid of claim 33 further comprising a crosslinker in an amount of from about 0.01 wt. % to about 5 wt. % based on the total weight of the wellbore servicing fluid.

35. The wellbore servicing fluid of claim 34 wherein the water-soluble crosslinkable composition comprises a polymerizable water-soluble monomer.

36. The wellbore servicing fluid of claim 35 further comprising a multifunctional polymerizable water-soluble crosslinker, a water-soluble polymerization initiator, an oxygen scavenger, or combinations thereof.

37. A pumpable wellbore servicing fluid system comprising:
(i) a permeability modifying fluid comprising a water-soluble crosslinkable composition in an amount of from about 0.2 wt. % to about 35 wt. %, a particulate water-swellable superabsorber in an amount of from about 0.01 wt. % to about 5 wt. %, based on the total weight of the wellbore servicing fluid, and an aqueous base fluid; and
(ii) a sweeping fluid selected from the group consisting of a chemical flooding fluid, an alkaline flooding fluid, a polymer flooding fluid, a micellar-polymer flooding fluid, an alkali surfactant polymer flooding fluid; a miscible displacement fluid, a carbon dioxide injection fluid, a nitrogen injection fluid, a hydrocarbon injection fluid, a foam injection fluid, a microbial injection fluid; a thermal recovery fluid, a steam flooding fluid, a cyclic steam flooding fluid, a continuous steam flooding fluid, a hot water flooding fluid, an in-situ combustion fluid, a fire flooding fluid; or combinations thereof.

* * * * *